(12) United States Patent
Hatanaka

(10) Patent No.: US 7,623,153 B2
(45) Date of Patent: Nov. 24, 2009

(54) UNINTENTIONAL HAND MOVEMENT CANCELING DEVICE AND IMAGING APPARATUS

(75) Inventor: Haruo Hatanaka, Kyoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 630 days.

(21) Appl. No.: 11/213,713

(22) Filed: Aug. 30, 2005

(65) Prior Publication Data

US 2006/0044404 A1  Mar. 2, 2006

(30) Foreign Application Priority Data

Aug. 31, 2004 (JP) .............................. 2004-253417
Aug. 5, 2005 (JP) .............................. 2005-227770

(51) Int. Cl.
*H04N 5/228* (2006.01)
(52) U.S. Cl. ............. 348/208.3; 348/208.4; 348/208.12
(58) Field of Classification Search ... 348/208.1–208.6, 348/208.99, 208.12, 154, 155; 396/52, 54, 396/55
See application file for complete search history.

(56) References Cited

U.S. PATENT DOCUMENTS

| | | | | | |
|---|---|---|---|---|---|
| 5,099,323 | A | * | 3/1992 | Morimura et al. ...... | 348/207.99 |
| 5,563,652 | A | * | 10/1996 | Toba et al. ............. | 348/207.99 |
| 5,748,231 | A | * | 5/1998 | Park et al. ............. | 348/207.99 |
| 5,867,213 | A | * | 2/1999 | Ouchi ..................... | 348/208.5 |
| 5,909,242 | A | * | 6/1999 | Kobayashi et al. ....... | 348/208.3 |
| 5,959,666 | A | * | 9/1999 | Naganuma ............... | 348/208.3 |
| 7,292,270 | B2 | * | 11/2007 | Higurashi et al. ........ | 348/208.3 |
| 7,502,050 | B2 | * | 3/2009 | Hatanaka et al. ......... | 348/208.3 |

(Continued)

FOREIGN PATENT DOCUMENTS

EP   0389192 A2   9/1990

(Continued)

OTHER PUBLICATIONS

Uomori, Kenya et al., "Automatic Image Stabilizing System by Full-Digital Signal Processing", IEEE Transactions on Consumer Electronics, vol. 36, No. 3, Aug. 1990. pp. 510-519.*

(Continued)

*Primary Examiner*—Jason Chan
*Assistant Examiner*—Gary C Vieaux
(74) *Attorney, Agent, or Firm*—Westerman, Hattori, Daniels & Adrian, LLP

(57) ABSTRACT

Provided is an unintentional hand movement canceling device, comprising: swing detecting means detecting a swing of an image; and a correction quantity generating means generating a correction quantity to calculate a correction position based on a swing quantity detected by the swing detection means, a damping coefficient of a swing quantity for controlling a characteristic of a non-corrected residue percent at a swing frequency and a damping center for controlling a centering velocity at which a correction position is caused to move to an initial position before correction, the correction quantity having a variable characteristic of a non-corrected residue percent at a frequency of the swing and a variable centering velocity at which a correction position is caused to move to an initial position before correction, wherein the correction quantity generating means includes means updating the damping center based on a preset damping coefficient of the damping center.

4 Claims, 16 Drawing Sheets

U.S. PATENT DOCUMENTS

2006/0044403 A1  3/2006  Hatanaka et al.

FOREIGN PATENT DOCUMENTS

| JP | 61-201581 |   | 9/1986 |
| --- | --- | --- | --- |
| JP | 05-091393 | A | 4/1993 |
| JP | 05-103253 | A | 4/1993 |
| JP | 7-23276 |   | 1/1995 |
| JP | 08-149360 | A | 6/1996 |
| JP | 08-331430 | A | 12/1996 |
| JP | 2006-74261 | A | 3/2006 |

OTHER PUBLICATIONS

Uomori, Kenya et al., "Electronic Image Stabilization System for Video Cameras and VCRs", SMPTE Journal, Feb. 1992, pp. 66-75.*

Kenya Uomori et al., "Intelligent Digital Stabilizer", Matsushita Electric Co. Ltd. and Central Research Laboratory, pp. 177-180 (1989).

Uomori, Kenya, et al., "Electronic Image Stabilization System for Video Cameras and VCRs," SMPTE Journal, Feb. 1992, pp. 66-75, vol. 101, No. 2, XP000252752.

Extended European Search Report issued on Sep. 22, 2009 in corresponding European Patent Office Application 05018809.

\* cited by examiner

UNINTENTIONAL HAND MOVEMENT CANCELING DEVICE AND IMAGING APPARATUS

BACKGROUND OF THE INVENTION

1. Field of the Invention

The invention relates to an unintentional hand movement canceling device installed in, for example a video camera and a digital camera, and an imaging apparatus such as a video camera and a digital camera.

2. Description of the Related Art

A method for detecting a swing component of an image pick-up device, as an example, was presented in the 20th image optics conference (1989) from Matsushita Electric Industrial Co., Ltd. This method is to detect a swing component of an image pick-up device from image information using a motion vector obtained from a representative point matching method described in JP-A No. 61-201581 [H04N7/137] laid open to public on Sep. 6, 1986. In this presentation, a damping coefficient is introduced in a method for canceling an unintentional hand movement based on motion vectors obtained from image information. Besides, 4 detection regions are arranged on a screen image and partial motion vectors are calculated in the respective 4 detection regions.

Description will be given here of a method for canceling an unintentional hand movement based on the obtained partial motion vectors. The average of 4 partial motion vectors or the like is used as each of overall vectors of frames. An integral vector $S_n$ is given by the following equation (1) when an overall motion vector is indicated with $V_n$;

$$S_n = K \cdot S_{n-1} + V_n \quad (1)$$

In the equation (1), $S_n$ indicates an integral vector in a current frame, $S_{n-1}$ an integral vector in the immediately proceeding frame, $V_n$ an overall motion vector and K a damping coefficient of an integral vector. A damping coefficient K of an integral vector K is a decimal less than 1.

By moving a trimming position of a screen image with thus obtained integral vector $S_n$, an unintentional movement of image due to an unintentional hand movement is corrected. An integral vector $S_n$, as shown in FIG. 7, expresses a distance to and a direction toward the center Ot of a displayed region (trimming frame 100) from the center O of an image memory (frame memory 15).

Controlling a damping coefficient K can cause a non-corrected residue percent (a frequency characteristic of a swing to be corrected) at a frequency of a swing and a velocity returning a trimming position of an image to the center of an image memory (the velocity is hereinafter referred to as a centering velocity) to be altered. A non-corrected residue percent is defined as a proportion (%) of the amplitude of a swing after the correction, relative to the amplitude of a swing before the correction.

FIG. 19 shows a relationship between a swing frequency [Hz] and a non-corrected residue percent (%) with a damping coefficient K as a parameter.

For example, in a case where K=1.0, a detected movement is perfectly corrected. In a case where K=0.90, a swing of 2 [Hz] is corrected by about 50% and a swing of 5 [Hz] is corrected by about 70%. That is, with a decrease in damping coefficient K, a correction level for a swing in lower frequency band is weakened.

Since a damping coefficient K plays two roles to control a frequency characteristic of a swing to be corrected and a centering velocity, a characteristic cannot be set independently of the other. For example, if a damping coefficient K is reduced with an intention not to correct a swing in low frequency region, a centering velocity increase as a side effect; therefore a problem has arisen that a phenomenon that an image moves in a delayed manner even if a motion of a video camera is stopped becomes conspicuous (the phenomenon is hereinafter referred to as a delayed swing).

To the contrary, if a damping coefficient K is set to 1 so as to perfectly correct a swing in low frequency band, a problem has arisen that no centering occurs and a correction range cannot be secured. A proposal has been offered in JP-A No. 7-23276 on a measure to cope with this problem. In the publication, attention has been paid to the fact that a delayed swing is conspicuous after shooting in panning or tilting and a trimming position of an image is moved toward the center side of an image memory by a predetermined portion of a motion vector during a panning or tilting shooting. However, a problem has arisen that since erroneous detection of a motion vector occurs frequently during shooting in panning or tilting, operability during the shooting in panning or tilting is greatly reduced.

SUMMARY OF THE INVENTION

It is an object of the invention to provide an unintentional hand movement correcting device and an imaging apparatus, capable of setting a frequency of a swing to be corrected and a centering characteristic for an image trimming position independently of each other and thereby correcting an unintentional hand movement better.

A first unintentional hand movement canceling device according to the invention includes: swing detecting means detecting a swing of an image; and a correction quantity generating means generating a correction quantity to calculate a correction position based on a swing quantity detected by the swing detection means, a damping coefficient of a swing quantity for controlling a characteristic of a non-corrected residue percent at a swing frequency and a damping center of the swing quantity, the correction quantity having a variable characteristic of a non-corrected residue percent at a frequency of the swing and a variable damping center of a swing quantity.

A second unintentional hand movement canceling device according to the invention includes: swing detecting means detecting a swing of an image; and a correction quantity generating means generating a correction quantity to calculate a correction position based on a swing quantity detected by the swing detection means, a damping coefficient of a swing quantity for controlling a characteristic of a non-corrected residue percent at a swing frequency and a damping center for controlling a centering velocity at which a correction position is caused to move to an initial position before correction, the correction quantity having a variable characteristic of a non-corrected residue percent at a frequency of the swing and a variable centering velocity at which a correction position is caused to move to an initial position before correction, wherein the correction quantity generating means includes means updating the damping center based on a preset damping coefficient of the damping center.

A third unintentional hand movement canceling device according to the invention includes: swing detecting means detecting a swing of an image; state discriminating means discriminating a swing state due to an intentional camera motion by a cameraman or a camerawomen from an unintentional hand movement state; a first correction quantity generating means, when it is determined by the state discriminating mean that a current state is an unintentional hand movement state, generating a correction quantity to calculate a correction position based on a swing quantity detected by the swing detection means, a damping coefficient of a swing quantity for controlling a characteristic of a non-corrected residue percent at a swing frequency and a damping center for controlling a centering velocity at which a correction position is caused to move to an initial position before correction, the correction quantity having a variable characteristic of a non-corrected residue percent at a swing frequency and a variable centering velocity at which a correction position is caused to move to an initial position before correction; a second correction quantity generating means, when it is determined that a current state is an intentional camera motion by a cameraman or a camerawomen, adopting a correction quantity of the immediately proceeding frame as a correction quantity for calculating a correction position; and means, when it is detected by the state discriminating means that an intentional camera motion by a cameraman or a camerawomen has changed to an unintentional hand movement state, setting a damping center to a correction position corresponding to the correction quantity at that time, wherein the first correction quantity generating means includes means to update the damping center based on a preset damping coefficient of the damping center.

A fourth unintentional hand movement canceling device according to the invention includes: swing detecting means detecting a swing of an image; and; a correction quantity generating means generating a correction quantity to calculate a image trimming position based on a swing quantity detected by the swing detection means, a damping coefficient of a swing quantity for controlling a characteristic of a non-corrected residue percent at a swing frequency and a damping center for controlling a centering velocity at which an image trimming position is caused to move to the center of a picked-up image, the correction quantity having a variable characteristic of a non-corrected residue percent at a swing frequency and a variable centering velocity at which an image trimming position is caused to move to the center of an picked-up image, wherein the correction quantity generating means includes means updating the damping center based on a preset damping coefficient of the damping center.

A fifth unintentional hand movement canceling device according to the invention includes: swing detecting means detecting a swing of an image; state discriminating means discriminating a swing state due to an intentional camera motion by a cameraman or a camerawomen from an unintentional hand movement state; a first correction quantity generating means, when it is determined that a current state is an unintentional hand movement state, generating a correction quantity to calculate an image trimming position based on a swing quantity detected by the swing detection means, a damping coefficient of a swing quantity for controlling a characteristic of a non-corrected residue percent at a swing frequency and a damping center for controlling a centering velocity at which the image trimming position is caused to move to the center of the picked-up image, the correction quantity having a variable characteristic of a non-corrected residue percent at a swing frequency and a variable centering velocity at which an image trimming position is caused to move to the center of a picked-up image, a second correction quantity generating means, when it is detected by the state discriminating means that a current state is a swing state due to an intentional camera motion by a cameraman or a camerawomen, adopting a correction quantity of the immediately proceeding frame as a correction quantity for calculating an image trimming position; and means, when it is detected by the state discriminating means that a swing state due to an intentional camera motion by a cameraman or a camerawomen has changed to an unintentional hand movement state, setting the damping center to an image trimming position corresponding to a correction quantity at that time, wherein the first correction quantity generating means includes means updating the damping center based on a preset damping coefficient of the damping center.

A first imaging apparatus according to the invention includes: swing detecting means detecting a swing of an image; and a correction quantity generating means generating a correction quantity to calculate a correction position based on a swing quantity detected by the swing detection means, a damping coefficient of a swing quantity for controlling a characteristic of a non-corrected residue percent at a swing frequency and a damping center of the swing quantity, the correction quantity having a variable characteristic of a non-corrected residue percent at a frequency of the swing and a variable damping center of a swing quantity.

A second imaging apparatus according to the invention includes: swing detecting means detecting a swing of an image; and a correction quantity generating means generating a correction quantity to calculate a correction position based on a swing quantity detected by the swing detection means, a damping coefficient of a swing quantity for controlling a characteristic of a non-corrected residue percent at a swing frequency and a damping center for controlling a centering velocity at which a correction position is caused to move to an initial position before correction, the correction quantity having a variable characteristic of a non-corrected residue percent at a frequency of the swing and a variable centering velocity at which a correction position is caused to move to an initial position before correction, wherein the correction quantity generating means includes means updating the damping center based on a preset damping coefficient of the damping center.

A third imaging apparatus according to the invention includes: swing detecting means detecting a swing of an image; state discriminating means discriminating a swing state due to an intentional camera motion by a cameraman or a camerawomen from an unintentional hand movement state; a first correction quantity generating means, when it is determined by the state discriminating mean that a current state is an unintentional hand movement state, generating a correction quantity to calculate a correction position based on a swing quantity detected by the swing detection means, a damping coefficient of a swing quantity for controlling a characteristic of a non-corrected residue percent at a swing frequency and a damping center for controlling a centering velocity at which a correction position is caused to move to an initial position before correction, the correction quantity having a variable characteristic of a non-corrected residue percent at a swing frequency and a variable centering velocity at which a correction position is caused to move to an initial position before correction; a second correction quantity generating means, when it is determined that a current state is an intentional camera motion by a cameraman or a camerawomen, adopting a correction quantity of the immediately proceeding frame as a correction quantity for calculating a correction position; and means, when it is detected by the state discriminating means that an intentional camera motion by a cameraman or a camerawomen has changed to an unintentional hand movement state, setting a damping center to a correction position corresponding to the correction quantity at that time, wherein the first correction quantity generating means includes means to update the damping center based on a preset damping coefficient of the damping center.

A fourth imaging apparatus according to the invention includes: swing detecting means detecting a swing of an image; and; a correction quantity generating means generating a correction quantity to calculate a image trimming position based on a swing quantity detected by the swing detection means, a damping coefficient of a swing quantity for controlling a characteristic of a non-corrected residue percent at a swing frequency and a damping center for controlling a centering velocity at which an image trimming position is caused to move to the center of a picked-up image, the correction quantity having a variable characteristic of a non-corrected residue percent at a swing frequency and a variable centering velocity at which an image trimming position is caused to move to the center of an picked-up image, wherein the correction quantity generating means includes means updating the damping center based on a preset damping coefficient of the damping center.

A fifth imaging apparatus according to the invention includes: swing detecting means detecting a swing of an image; state discriminating means discriminating a swing state due to an intentional camera motion by a cameraman or a camerawomen from an unintentional hand movement state; a first correction quantity generating means, when it is determined that a current state is an unintentional hand movement state, generating a correction quantity to calculate an image trimming position based on a swing quantity detected by the swing detection means, a damping coefficient of a swing quantity for controlling a characteristic of a non-corrected residue percent at a swing frequency and a damping center for controlling a centering velocity at which the image trimming position is caused to move to the center of the picked-up image, the correction quantity having a variable characteristic of a non-corrected residue percent at a swing frequency and a variable centering velocity at which an image trimming position is caused to move to the center of a picked-up image, a second correction quantity generating means, when it is detected by the state discriminating means that a current state is a swing state due to an intentional camera motion by a cameraman or a camerawomen, adopting a correction quantity of the immediately proceeding frame as a correction quantity for calculating an image trimming position; and means, when it is detected by the state discriminating means that a swing state due to an intentional camera motion by a cameraman or a camerawomen has changed to an unintentional hand movement state, setting the damping center to an image trimming position corresponding to a correction quantity at that time, wherein the first correction quantity generating means includes means updating the damping center based on a preset damping coefficient of the damping center.

DESCRIPTION OF THE PREFERRED EMBODIMENTS

Description will be given of examples of the invention below with reference to the accompanying drawings.

Figure 1:
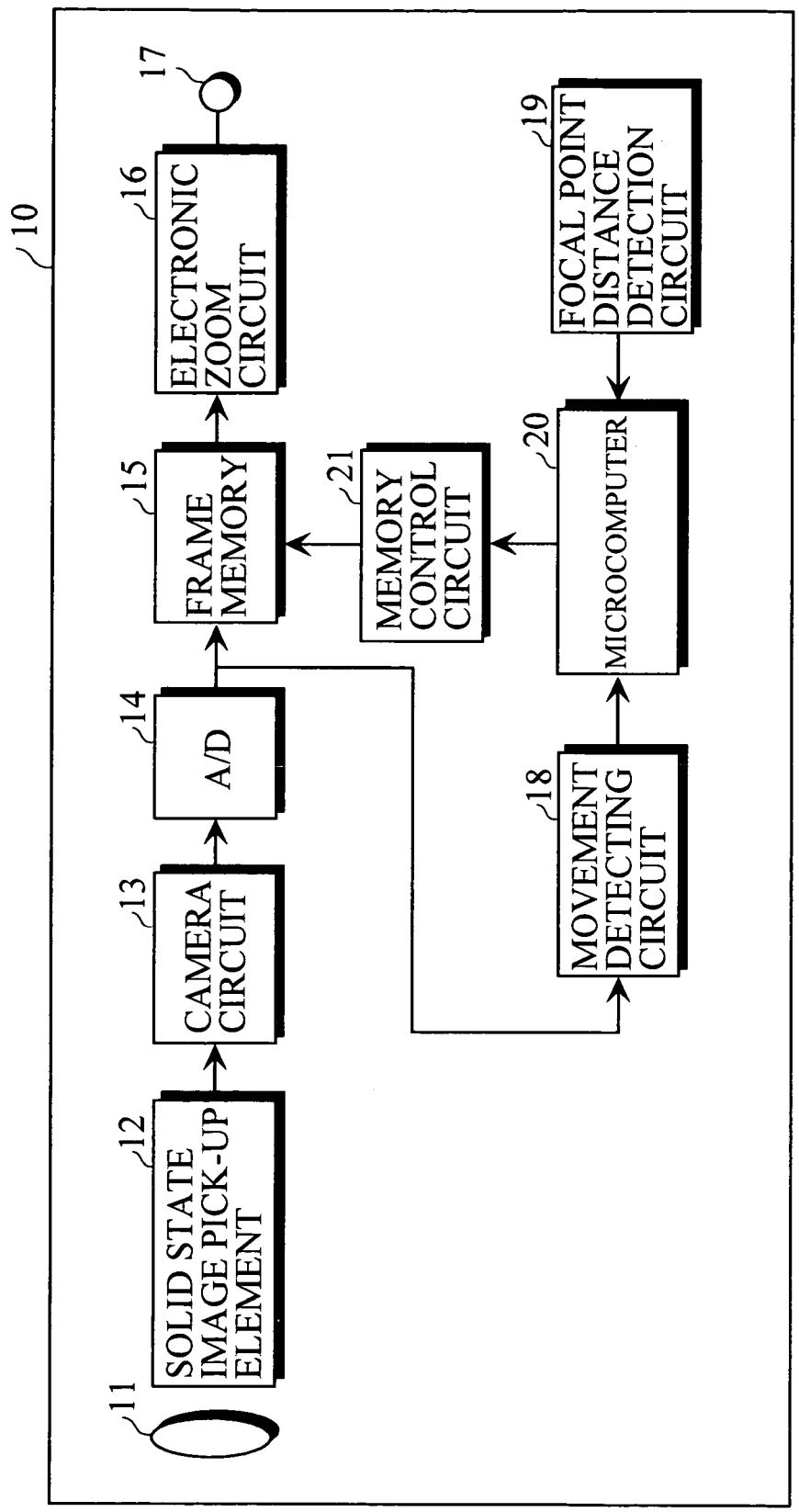
FIG. 1 is a block diagram showing an electric configuration of a video camera.

FIG. 1 shows a configuration of a video camera.

The video camera 10 includes: a solid state image pick-up element 12 such as CCD in which a light signal from an object (not shown) inputted from a lens 11 is converted to an electric signal. An electric signal from the solid state image pick-up element 12 is inputted to a camera circuit 13. The camera circuit 13, as well known, includes a sample holding circuit holding an electric signal from the solid state image pick-up element 12. Not only is a level of the sample-held electric signal adjusted by AGC, but a synchronizing signal is also attached thereto by a synchronizing signal attaching circuit. In such a way, the camera circuit 13 converts an image signal from the solid state image pick-up element 12 to an analog video signal.

An analog video signal outputted from the camera circuit 13 is further converted to a digital video signal by an A/D converter 14. A digital video signal outputted from the A/D converter 14 is given to a movement detecting circuit (swing detecting means) 18 and at the same time, written into a frame memory 15 by a memory control circuit 21

Figure 2:
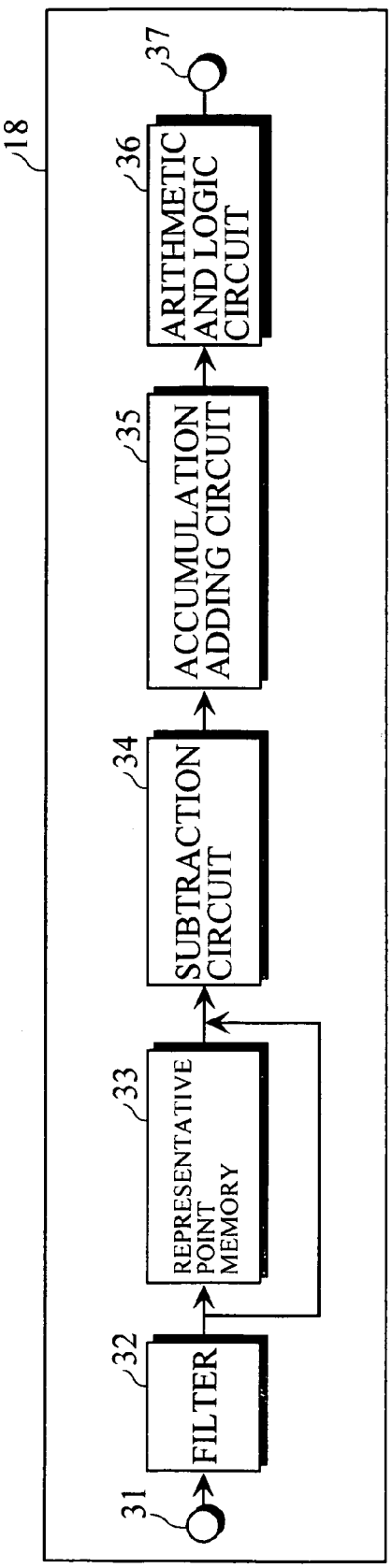
FIG. 2 is a block diagram showing an electric configuration of movement detecting circuit.

FIG. 2 shows a configuration of a movement detecting circuit 18.

Figure 3:
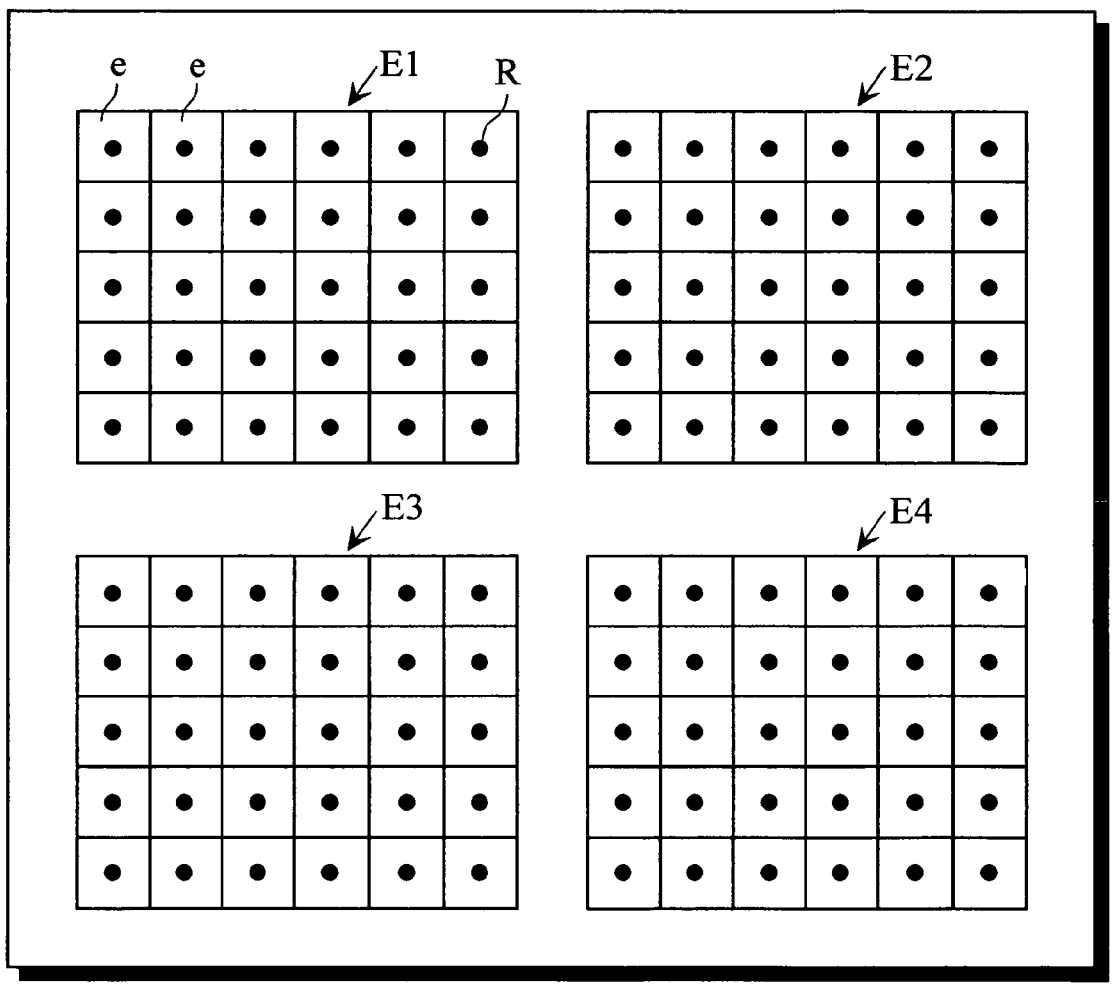
FIG. 3 is a model diagram showing plural motion vector detecting regions set in an image area.
Figure 4:
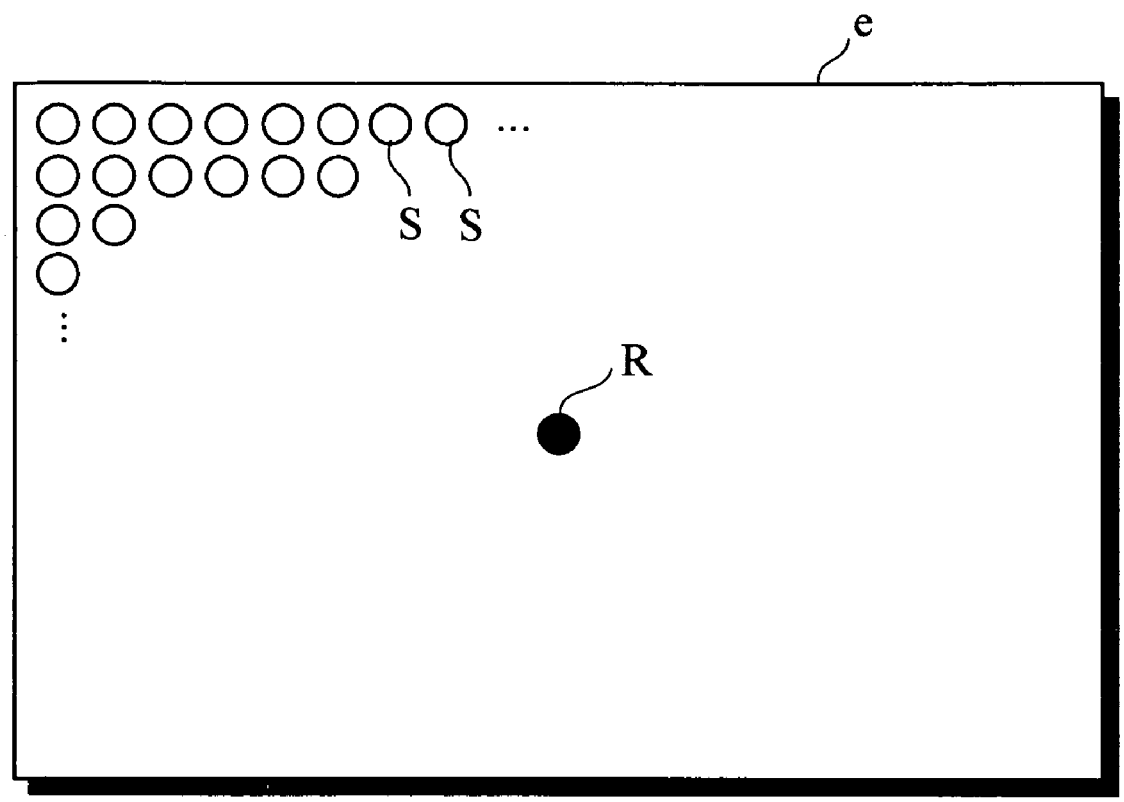
FIG. 4 is a model diagram showing plural sampling points set in small regions in each motion vector detecting region of FIG. 3 and one representative point.

The movement detecting circuit 18 detects a motion vector using, for example, a well known representative point matching method. Description will be given of an outline of the representative point matching method. Plural motion vector detection regions E1 to E4 are, as shown in FIG. 3, set in an image area of each frame. The motion vector detection regions E1 to E4 are the same as one another in size. Each of the motion vector detection regions E1 to E4 is divided into 30 small regions e. In this example, each of the motion vector detection regions E1 to E4 is divided into 30 small regions e. Each of the small regions e is constituted of, for example, 32 pixels×16 rows. Plural sampling points S and one representative point R are, as shown in FIG. 4, set in each of the small regions e.

A difference between a pixel value (luminance value) at sampling points S in each of the small regions e in a current frame and a pixel value (luminance value) of a representative point R of the corresponding small regions in the preceding frame (correlation values at the respective sampling point) are obtained in each of the motion vector detection regions E1 to E4. Then, correlation values are added and accumulated individually at the sampling points S with the respective same displacements from the representative points R of all the small regions e in each of the motion vector detection regions E1 to E4. Therefore, the correlation accumulated values in number corresponding to the number of the sampling points S in one small region e are obtained in each of the motion vector detection regions E1 to E4.

In each of the motion vector detection regions E1 to E4, a displacement from a representative point R having the minimum correlation accumulated value, that is the displacement of a point with the highest correlation is extracted as a motion vector of each of the motion vector detection regions E1 to E4.

The movement detection circuit 18 includes an input end 31 at which a digital video signal from the A/D converter 14 and a digital video signal inputted from the input end 31 is given to a representative point memory 33 and a subtraction circuit 34 through a filter 32. The filter 32 is a kind of a digital low pass filter and used in order to improve an S/N ratio and secure sufficient precision with fewer representative points. The representative point memory 33 memorizes positional data and luminance data of a representative point R in each of the small regions e of each of the motion vector, as shown FIG. 3, detection regions E1 to E4.

The subtraction circuit 34 performs subtraction between luminance data of the representative point of the preceding frame given from the representative point memory 33 and luminance data of a sampling point S of a current frame given from the input end 31 in each of the small regions e of each of the motion vector detection regions E1 to E4 to calculate a result in absolute value (a correlation value at each sampling point). The obtained correlation values at the sampling points are given to an accumulation adding circuit 35.

The accumulation adding circuit 35 adds and accumulates correlation values individually at the points having the same displacement from the representative point R in all the small regions e in each of the motion vector detection regions E1 to E4. The correlation accumulated value is given to an arithmetic and logic circuit 36.

The arithmetic and logic circuit 36 obtains not only the average value of correlation values in each of the motion vector detection regions E1 to E4, but also positional data of the pixel with the minimum correlation accumulated value. In such a way, the average values of correlation accumulated values, the minimum correlation accumulated values and the positional data of the pixel with the minimum correlation value obtained in the respective vector detection regions E1 to E4 are given to a microcomputer 20 (see FIG. 1).

The microcomputer 20 calculates a motion vector of the entire image (hereinafter referred to simply as overall motion vector) based on data given from the arithmetic and logic circuit 36. To begin with, a displacement from the representative point of a pixel with the minimum correlation accumulated value is obtained based on positional data of the pixel with the minimum correlation accumulated value in each of the motion vector detection regions E1 to E4 and the displacements are used as motion vectors (partial motion vectors) of the respective motion vector detection regions E1 to E4. Note that in order to better detection precision of partial motion vectors, correlation accumulated values of 4 pixels surrounding the pixel with the minimum correlation accumulated value may also be used and interpolated to calculate positional data of the pixel with the minimum correlation value.

The microcomputer 20 determines whether or not a value obtained by dividing the average value of the correlation accumulated values with the minimum correlation accumulated value is more than a given threshold value and further determines whether or not the average value of correlation accumulated values is a predetermined value or more in each of the motion vector detection regions E1 to E4; thereby determines whether or not partial motion vectors obtained in each of the motion vector detection regions E1 to E4 is reliable, that is determined whether each of the motion vector detection regions E1 to E4 is valid or invalid. If, in a motion vector detection region, a value obtained by dividing the average value of the correlation accumulated values with the minimum correlation accumulated value is more than a given threshold value and the average value of the correlation accumulated values is more than a predetermined value, the motion vector detection region is regarded as a valid region.

To be concrete, whether or not a motion vector detection region is valid or invalid is determined in a way described below. First of all, if a contrast of a screen image is low, a luminance difference is low; therefore, the correlation accumulated value is decreased. For example, if the entire screen image is white, the correlation accumulated value is reduced. In such a case, a reliability is lost; therefore a region is regarded as valid when a relation that the average value of the correlation accumulated value≧a predetermined value. Note that the predetermined value is empirically determined.

In a case where a moving object exists in a motion vector detection region, a correlation accumulated value in a portion occupied by the moving object is different from a correlation accumulated value in a portion not occupied by the moving object and the portion occupied by the moving object takes various correlation accumulated values, which are generally larger (a correlation is low). Therefore, in a case where a moving object is in a moving vector detection region, a possibility is low that the minimum correlation accumulated value is high and there is a risk that a motion vector (partial motion vector) in a motion vector detection region is erroneously detected.

If a partial motion vector is erroneously detected, an overall motion vector is erroneously detected. If the average value of the correlation accumulated values is large, the region can be reliable even if the minimum correlation accumulated value is large to some extent. On the other hand, if the average value of the correlation accumulated values is small, the region cannot be relied on unless the minimum correlation accumulated value is smaller. Hence, to be concrete, a motion vector detection region satisfying a condition of (the average value of correlation accumulated values)/(the minimum correlation accumulated value)>5 is determined as a valid region and a partial motion vector of a motion vector detection region not satisfying the condition is not used to thereby prevent a harmful influence due to erroneous detection.

Whether or not a motion vector detection region is valid is determined with the two conditions. Then, the average of partial motion vectors of motion vector detection regions each of which has been determined to be a valid region is obtained, the average is adopted as a movement quantity between frames, that is used as a movement quantity between frames, that is the overall motion vector $V_n$. Overall motion vector $V_n$ expresses a movement quantity and a direction of the movement between the frames. The microcomputer 20 obtains an integral vector $S_n$ using the overall motion vector $V_n$. Description will be given later of a way to obtain the integral vector $S_n$. The integral vector $S_n$ expresses a distance from the center of a frame memory 15 to the center of a display region (a trimming frame).

Figure 5:
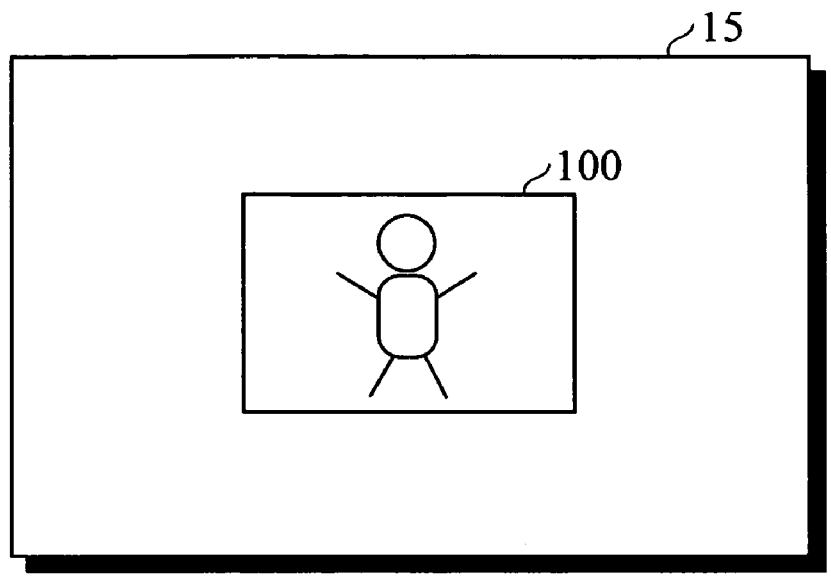
FIG. 5 is a model diagram showing a relationship between a frame memory and a trimming frame.
Figure 6:
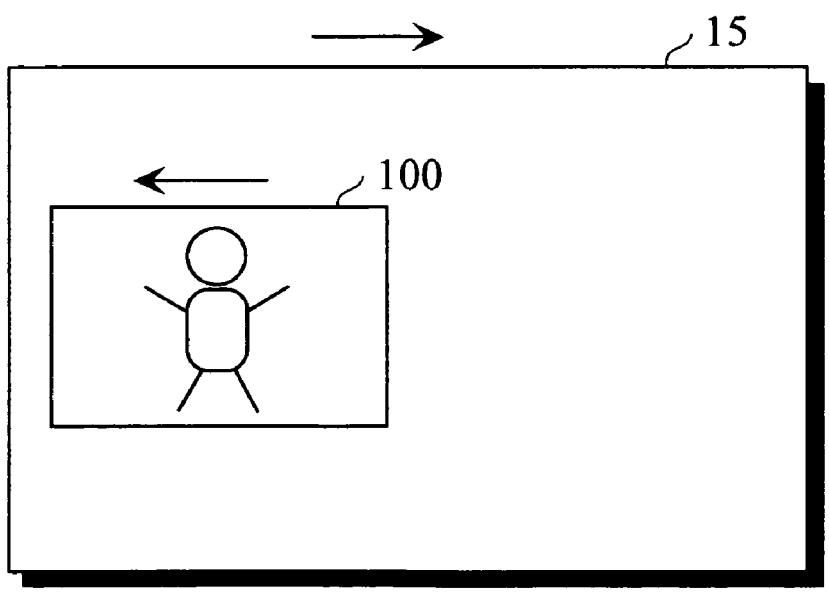
FIG. 6 is a model diagram showing a relationship between a frame memory and a trimming frame when a video cameral moves in a right direction.

In correction for an unintentional hand movement correction, the correction is performed by changing a position of a display region (image trimming position) in the frame memory 15. In FIG. 5, there is shown a relationship between the frame memory 15 and the trimming frame 100. A region enclosed by the trimming frame 100 in the frame memory 15 is displayed as a picked-up image. An initial position of the trimming frame 100 is set at a position where the center of the trimming frame 100 coincides with the center of the frame memory 15. The initial position is moved so as to adapted for a detected motion vector. For example, in FIG. 6, there is shown a relationship between the frame memory 15 and the trimming frame 100 when the video camera moves to the right. When the video camera is moved to the right, the object moves in the frame memory to the left. On this occasion, the trimming frame 100 is moved in a direction opposite the movement of the video camera by the movement quantity of the video camera, no change occurs in the displayed screen image (figure) and the unintentional hand movement is cancelled.

Figure 7:
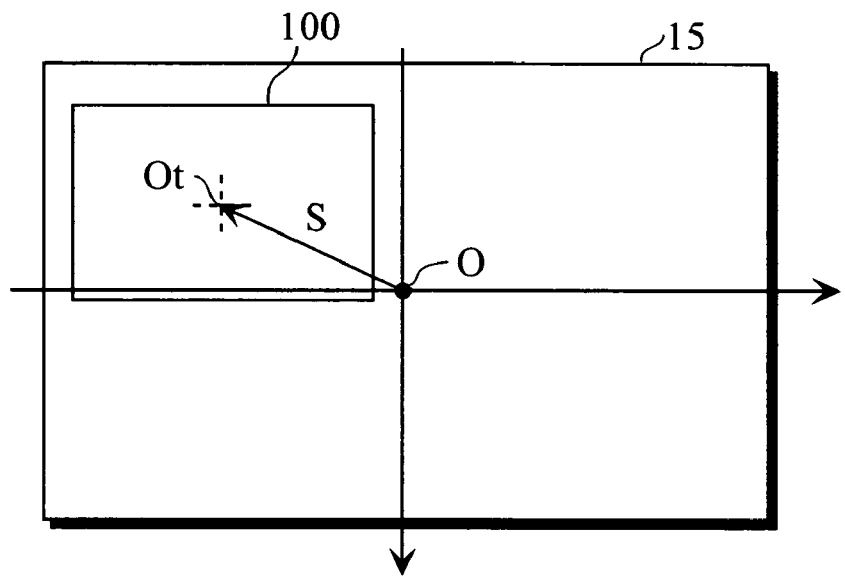
FIG. 7 is model diagram showing a relationship between an integral vector and a trimming frame.

FIG. 7 shows a relationship between an integral vector S and a trimming frame 100. A position of the trimming frame 100 is given with coordinates Ot of the center of the trimming frame 100 in an XY coordinate system with the center of the frame memory 15 as the origin. If an integral vector of the current frame is indicated with S, a point in a distance indicated by the integral vector S in a direction shown by the integral vector S from the center O of the frame memory 15 is the center Ot of the trimming frame 100.

Figure 8:
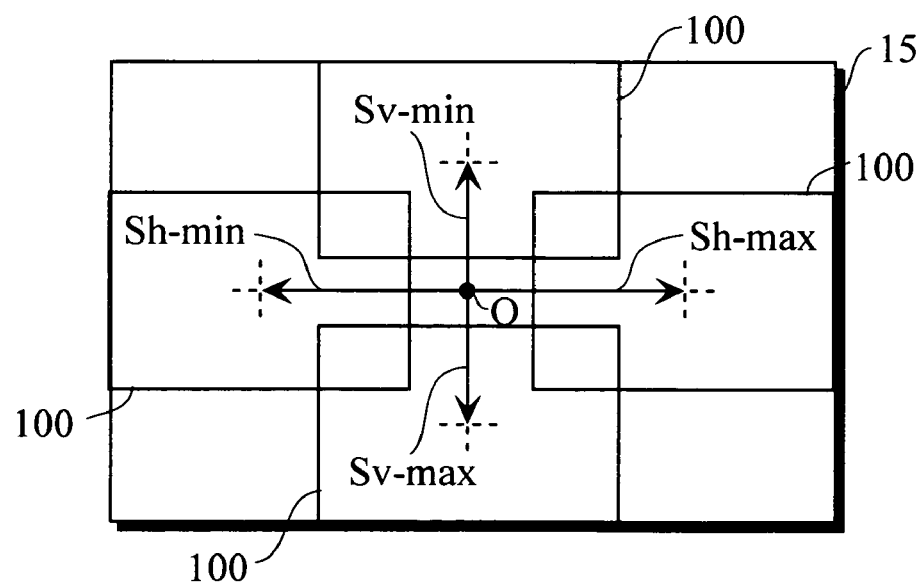
FIG. 8 is a model diagram for describing a correction range for an unintentional hand movement.

A range of correction for an unintentional hand movement, as shown FIG. 8, covers a range at which the trimming frame 100 reaches an end of the frame memory 15. That is, ranges of a horizontal component Sh and a vertical component Sv of the integral vector S are Sh-min to Sh-max in FIG. 8 and Sv-min to Sv-max, respectively.

Figure 9:
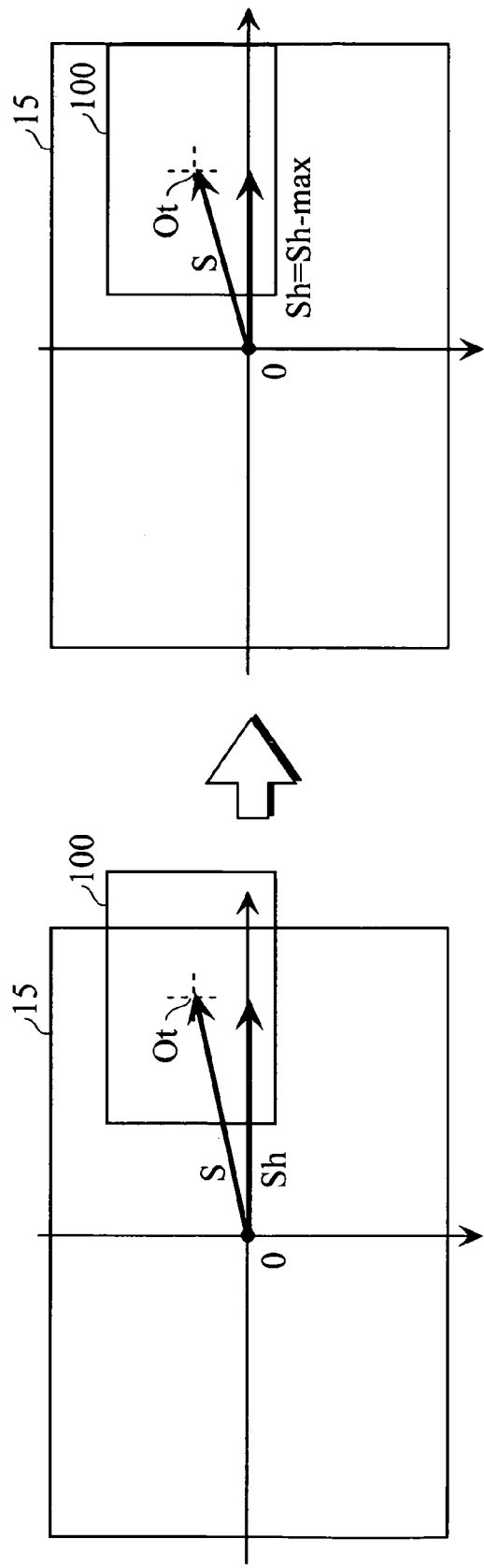
FIG. 9 is model diagrams for describing a processing in a case where a movement exceeds a correction range for an unintentional hand movement.

In a case where the video camera, as shown in FIG. 9, moves by a great distance and the horizontal component Sh of the integral vector S falls outside a limit value of the correction range, the horizontal component Sh is set to Sh-min (limit value) if the horizontal component is smaller than Sh-min, while the horizontal component Sh is set to Sh-max (limit value) if the horizontal component is larger than Sh-max. In a case where the vertical component Sv falls outside a limit value of the correction range, similarly to the above, the vertical component Sv is set to Sv-min (limit value) if the vertical component is smaller than Sv-min, while the vertical component Sv is set to Sv-max (limit value) if the horizontal component is larger than Sv-max.

A calculation method for an integral vector $S_n$ is different according to whether a current state is an unintentional hand movement state or a panning or tilting state. The states can be discriminated therebetween by the microcomputer 20. Data which indicates whether a current state is an unintentional hand movement state or a panning or tilting state is stored in a memory (not shown) of the microcomputer 20.

In the unintentional hand movement state, the microcomputer 20 obtains a damping coefficient K of an integral vector using a lens focal point distance F in terms of 35 mm film acquired by the focal point distance detecting circuit 19, the minimum focal point distance $F_{min}$ and the maximum focal point distance $F_{max}$, set in advance and the minimum damping coefficient value $K_{min}$ and the maximum damping coefficient value $K_{max}$, set in advance according to the following equation (2).

$$K = K_{min} + \frac{F - F_{min}}{F_{max} - F_{min}}(K_{max} - K_{min}) \qquad (2)$$

Then, an integral vector $S_n$ is calculated based on the following equation (3).

$$S_n = K \cdot (S_{n-1} - C) + V_n + C \qquad (3)$$

In the equation (3), K is a damping coefficient of an integral vector calculated based on the equation (2). $V_n$ is an overall motion vector $V_n$ between a preceding frame and the current frame. $S_{n-1}$ is an integral vector of the preseding frame. C is a damping center. An initial value of the damping center C is 0 and an integral vector $S_n$ is updated based on the following equation (4) each time when an integral vector $S_n$ is calculated using the equation (3).

$$C = K_c \cdot C \qquad (4)$$

In the equation (4), $K_c$ is a damping coefficient of a preset damping center. In a panning or tilting state as shown the following equation (5), the microcomputer 20 regards the integral vector $S_{n-1}$ of an immediately preceding frame stored on a memory of the microcomputer 20 as an integral vector $S_n$ of the current frame. That is, it means that no correction of unintentional hand movement is applied.

$$S_n = S_{n-1} \qquad (5)$$

Transition from an unintentional hand movement state to a panning or tilting state is required that one of the transition conditions described later (a), (b) and (c) is satisfied.

(a) A first condition for transition from an unintentional hand movement state to a panning or tilting state is that frames having overall motion vectors $V_n$ in the same direction continuously occur and the number of the frames in continuation is a threshold value 30 or more.

To be concrete, frames having overall motion vectors $V_n$, directions (upward or downward) of vertical components of which are the same continuously occur, and the number of the frames in continuation is 30 or more or frames having overall motion vectors $V_n$ directions (left or right) of horizontal components of which are the same continuously occur and the number of the frames in continuation is a threshold value 30 or more.

(b) A second condition for transition from an unintentional hand movement state to a panning or tilting state is that frames having integral vectors $S_n$ of a limit value or more of a correction range continuously occur and the number of the frames in continuation is 10 or more.

To be concrete, frames having integral vectors $S_n$, vertical components of which are a limit value or more of a correction range continuously runs and the number of the frames in continuation is 10 or more or frames having integral vectors $S_n$, horizontal components of which are a limit value or more of a correction range continuously runs and the number of the frames in continuation is 10 or more.

Note that in a case where a vertical component Sv of an integral vector $S_n$ falls outside a limit value of a correction range, a vertical component Sv is set to Sv-min (limit value) if being smaller than Sv-min, while a vertical component is set to Sv-max if being larger than Sv-max. In a case where a horizontal component Sh of an integral vector $S_n$ falls outside a limit value of a correction range, a horizontal component Sv is set to Sh-min (limit value) if being smaller than Sv-min, while a horizontal component is set to Sh-max (limit value) if being larger than Sv-max.

(c) A third condition for transition from an unintentional hand movement state to a panning or tilting state is that frames having overall motion vectors $V_n$ in the same direction continuously occur and an integral value of the overall motion vectors $V_n$ in continuation in the same direction is 20% or more of an image angle of an image angle (an image size of a trimming frame).

To be concrete, frames having overall motion vectors $V_n$ directions of vertical components (upward or downward) of which are the same continuously occur and an integral value of the vertical components of the overall motion vectors $V_n$ which continuously occur in the same direction is 20% or more of a width in a direction, upward or downward, of a trimming frame; or frames having overall motion vectors $V_n$ directions (left or right) of horizontal components of which are the same continuously occur and an integral value of the horizontal components of the overall motion vectors $V_n$ which continuously occur in the same direction is 20% or more of a width in a direction, left or right of a trimming frame.

A transition from a panning or tilting state to an unintentional state requires that one of the transition conditions (a) and (b) is satisfied.

(a) A first transition condition from a panning or tilting state to an unintentional hand movement is that frames having overall motion vectors $V_n$ of 0.5 pixel or less continuously occur and the number of the frames in continuation is 10 or more.

To be concrete, frames having overall vectors $V_n$, vertical components of which is 0.5 pixel or less continuously occur and the number of the frames in continuation is 10 or more, or frames having overall vectors $V_n$, horizontal components of which is 0.5 pixel or less and the number of the frames in continuation is 10 or more.

(b) A second transition condition from a panning or tilting state to an unintentional hand movement is that frames having overall motion vectors $V_n$ in directions opposite directions of overall motion vectors $V_n$ when an unintentional hand movement state changes to a panning or a tilting state continuously occur and the number of the frames is 10 or more.

To be more concrete, frames having overall motion vectors $V_n$ directions of vertical components of which are opposite directions of vertical components of overall motion vectors $V_n$ when an unintentional hand motion state changes to a panning or tilting state continuously occur and the number of the frames in continuation is 10 or more or frames having overall motion vectors $V_n$ directions of horizontal components of which are opposite directions of horizontal components of overall motion vectors $V_n$ when an unintentional hand motion state changes to a panning or tilting state continuously occur and the number of the frames in continuation is 10 or more.

The microcomputer 20, when a panning or tilting state is transitioned to an unintentional hand movement state, set an integral vector $S_n$ at that time to a damping center C. That is, a damping center C on a memory of the microcomputer 20 is updated to the same data as an integral vector $S_n$ at that time.

In this example, a damping coefficient K of an integral vector takes a value in the range of from 0.9 to 0.95 for a focal point distance in the range of from 38 to 280 nm. A damping coefficient $K_c$ of the damping center is set to 0.98. A damping coefficient K of an integral vector is controlled, thereby enabling a characteristic of a frequency of an unintentional hand movement that is being corrected to be altered. Besides, since after a panning or tilting operation where a centering velocity is fast and a change in figure is large, a damping center C is set to an integral vector $S_n$ immediately after the panning or tilting operation ends, a drastic centering caused by a damping coefficient K of an integral vector does not work any more. A gentle centering caused by a damping coefficient $K_c$ (=0.98) of a damping center is conducted instead and a correction range is secured without being noticed by a cameraman or a camerawoman.

An integral vector $S_n$ thus obtained is given to the memory control circuit 21. The memory control circuit 21 determines a start address for reading the frame memory 15 based on the given integral vector $S_n$ and reads a digital video signal at the address stored in the frame memory 15. That is, the memory control circuit 21 moves a trimming frame 100 in the frame memory 15 based on the integral vector $S_n$ calculated by the microcomputer 20.

A digital signal read from the frame memory 15 by the memory control circuit 21 is sent to the electronic zoom circuit 16. The electronic zoom circuit 16, in order to obtain a video signal corresponding to a size of the memory frame 15, enlarges an image using an interpolation method based on the digital video signal read from the frame memory 15. A digital signal outputted from the electronic zoom circuit 16 is sent to the output terminal 17.

Figure 10:
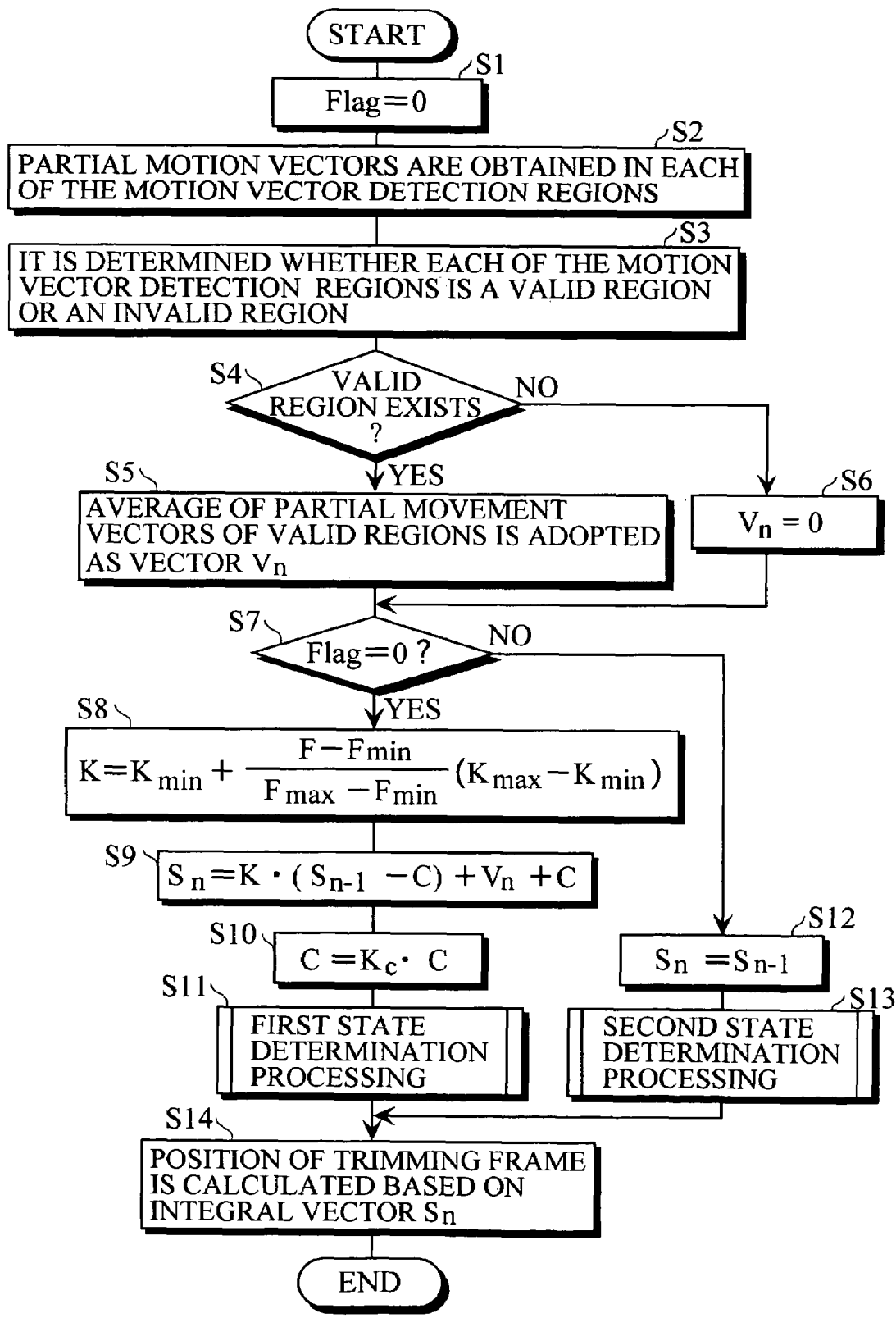
FIG. 10 is a flowchart showing operations in a video camera 10 performed for each frame.

FIG. 10 shows operations in the video camera 10 performed for each frame.

Flag used as a flag memorizing whether a current state is an unintentional hand movement state or a panning or tilting state. If Flag is reset (Flag=0), it shows that the current state is an unintentional hand movement state, while if Flag is set (Flag=1), it shows that the current state is a panning or tilting state.

To begin with, Flag is reset (Flag=0) (step S1). That is, an unintentional hand movement state is set as an initial state.

Partial motion vectors are obtained based on positional data of the pixel with the minimum correlation accumulated value in each of the motion vector detection regions E1 to E4 (step S2).

Then, it is determined whether each of the motion vector detection regions E1 to E4 is a valid region or an invalid region based on the average values and the minimum value of correlation accumulated values in each of the motion vector detection regions E1 to E4 (step S3). Thereby, it is determined whether or not a valid region exists (step S4).

If valid regions exist, the average of partial motion vectors of valid regions is adopted as an overall motion vector $V_n$ (step S5). Then, the process advances to step S7. In step S7, it is determined whether or not Flag is zero (Flag=0). If no valid region exists, an overall motion vector $V_n$ is set to 0 (step S6). Then, the process advances to step S7. In step S7, it is determined whether or not a current state is an unintentional hand movement or a panning or tilting state.

In a case where Flag=0, that is if the current state is an unintentional hand movement, a focal point distance in terms of 35 mm film is acquired from the focal point distance detection circuit 19 and a damping coefficient K is calculated based on the equation (2) (step S8). An integral vector $S_n$ is calculated based on the equation (3) using the calculated K (step S9). Thereafter, a damping center C is updated based on the equation (4) (step S10). After the first state determination processing is conducted (step S11), the process advances to step S14. The first state determination processing will be described later.

In step S7, if Flag=1, that is if a current state is a panning or tilting state, an integral vector $S_n$ is calculated based on the equation (5) (step S12). Then, after the second state determination processing is conducted (step S13), the process advances to step S14. The second state determination processing will be described later.

In step S14, a position of a trimming frame is calculated based on the integral vector $S_n$ calculated in step S9 or S12. Then, the current process is terminated.

Figure 11:
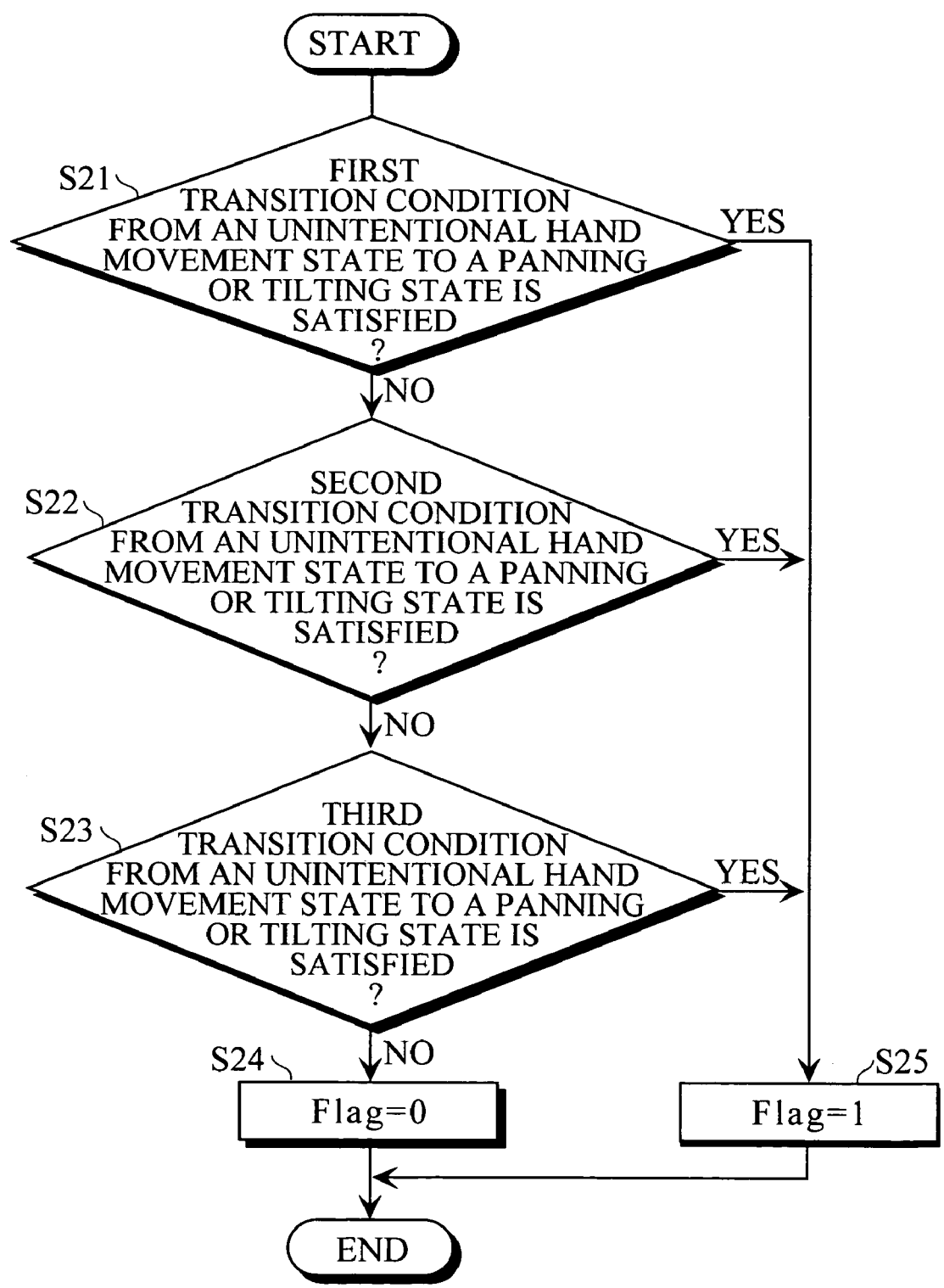
FIG. 11 is a flowchart showing a procedure for a first state determination processing in step S11 of FIG. 10.

FIG. 11 shows a procedure for the first state discrimination processing in step S11 of FIG. 10.

First of all, it is determined whether or not the first transition condition from an unintentional hand movement state to a panning or tilting state is satisfied (step S21). That is, it is determined whether or not a condition that frames having overall motion vectors $V_n$ in the same direction continuously occur and the number of the frames in continuation is 30 or more is satisfied. If the first transition condition is satisfied, it is determined that a current state is a panning or tilting state, that is it is determined that an unintentional hand movement state has transitioned to a panning or tilting state and Flag is set (Flag=1) (step S25). Then, the process moves to step S14 of FIG. 10.

If the first transition condition is not satisfied, it is determined whether or not the second transition condition from an unintentional hand movement state to a panning or tilting state is satisfied (step S22). That is, it is determined whether or not a condition that frames having integral vectors $S_n$ that are a limit value or more of a correction range continuously occur and the number of the frames in continuation is the 10 or more is satisfied. If the second transition condition is satisfied, it is determined that a current state is a panning or tilting state, that is it is determined that an unintentional hand state has transitioned to a panning or tilting state and Flag is set (Flag=1).(step S25). Then, the process moves to step S14 of FIG. 10.

If the second transition condition is not satisfied, it is determined whether or not the third transition condition from an unintentional hand movement state to a panning or tilting state is satisfied (step S23). That is, it is determined whether or not a condition that frames having overall motion vectors $V_n$ in the same direction continuously occur and an integral value of the overall motion vectors $V_n$ continuously occurring in the same direction is 20% or more of an image angle (an image size of a trimming frame) is satisfied. If the third transition condition is satisfied, it is determined that a current state is a panning or tilting state, that is an unintentional hand movement state has transitioned to a panning or tilting state, and Flag is set (Flag=1) (step S25). Then, the process moves to step S14 of FIG. 10.

If the third transition condition is not satisfied, it is determined that a current state is an unintentional hand movement state and Flag is reset (Flag=0) (step S24). Then, the process moves to step S14 of FIG. 10.

Figure 12:
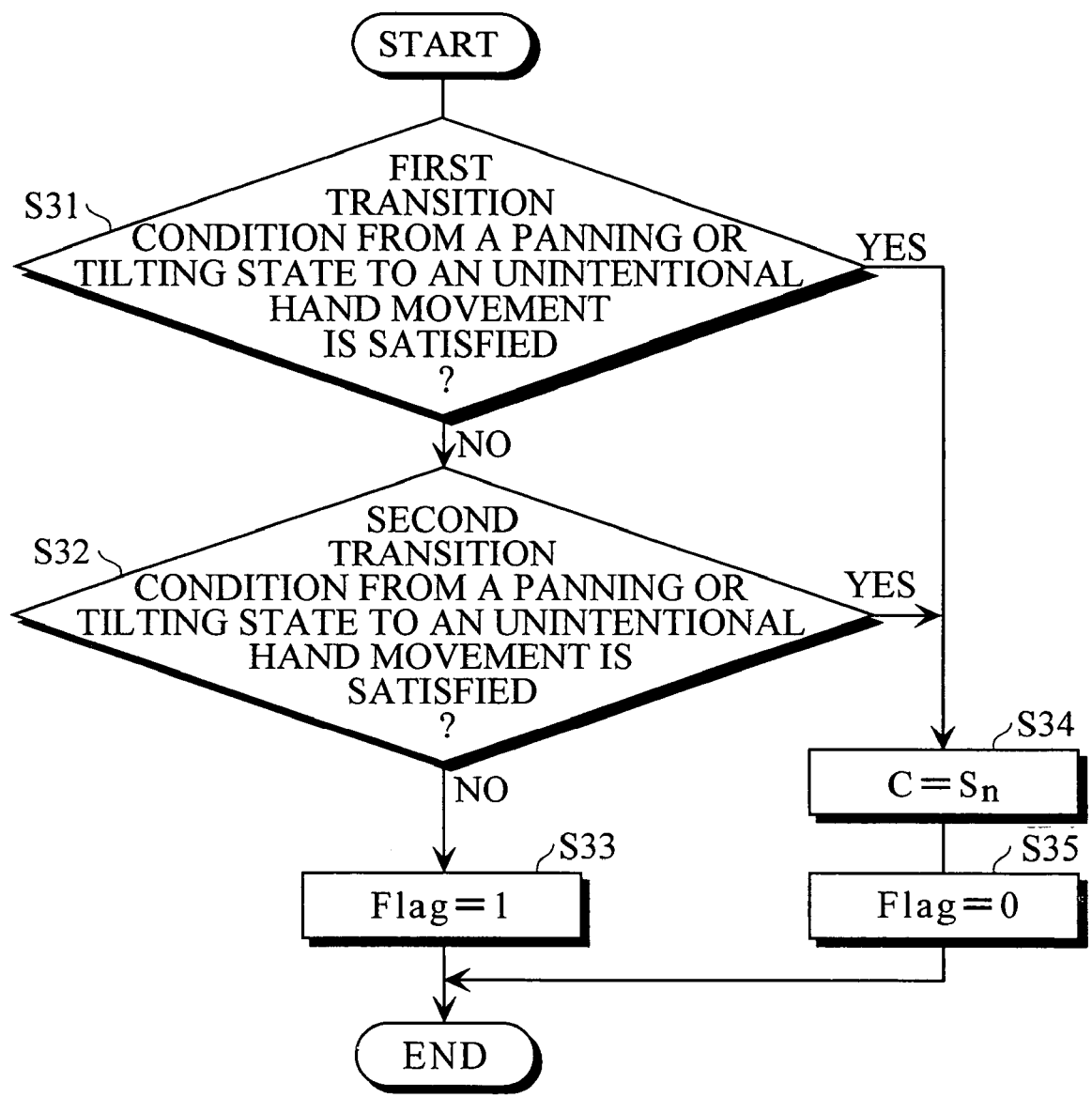
FIG. 12 is a flowchart showing a procedure for a second state determination processing in step S13 of FIG. 10.

FIG. 12 shows a procedure for the second state determination processing in step S12 of FIG. 10.

To begin with, it is determined whether or not the first transition condition from a panning or tilting state to an unintentional hand movement state is satisfied (step S31). That is, it is determined whether or not an overall motion vector $V_n$ satisfies a condition that frames having overall motion vectors $V_n$ of 0.5 pixel or less continuously occur and the number of the frames in continuation is 10 or more is satisfied. If the first condition is satisfied, it is determined that a current state is an unintentional hand movement state, that is it is determined that a panning or tilting state has transitioned to an unintentional hand movement state and after a damping center C is set to an integral vector $S_n$ of the current frame (step S34), Flag is reset (Flag=0) (step S35). Then the process moves to step S14 of FIG. 10.

If the first transition condition is not satisfied, it is determined whether or not the second transition condition from a panning or tilting state to an unintentional hand movement state is satisfied (step S32). That is, it is determined that, a condition that frames having overall motion vectors $V_n$ in directions opposite directions of overall motion vectors when an unintentional hand movement state is transitioned to a panning or tilting state continuously occur and the number of the frames in continuation is 10 or more is satisfied. If the second transition condition is satisfied, it is determined that a current state is an unintentional hand movement state, that is it is determined that a panning or tilting state has transitioned to an unintentional hand movement state and after a damping center C is set to an integral vector $S_n$ (step S34), Flag is reset (Flag=0) (step S35). Then the process moves to step S14 of FIG. 10.

If the second transition condition is not satisfied, it is determined that a current state is a panning or tilting state and Flag is set (Flag=1) (step S33). Then the process moves to step S14 of FIG. 10.

In the video camera 10 operated in such a way, a damping coefficient K of an integral vector is decreased on an optical wide side (with a small zoom magnification) where a stick feeling was conventionally conspicuous in a panning or tilting operation. Hence, on the optical side, since a correction level for a swing in a low frequency band is weakened, some of movement of a video camera at an initial stage after the start of a panning or tilting operation remains non-corrected even in a case where detection of a panning or tilting state fails, and a stick feeling is alleviated.

Therefore, as compared with a conventional case, operability on the optical wide side is improved (a clattering motion is reduced) and correction for an unintentional hand movement with a good operability can be realized all over the zoom region.

When a panning or tilting state has transitioned to an unintentional hand movement state, a damping center C moves to a current trimming position of an image and thereafter, in an unintentional hand movement state, the damping center C is gradually subjected to centering to the center of the frame memory 15. Therefore, a phenomenon can be eliminated that a trimming position of an image is, as conventional, rapidly subjected to centering after a panning or tilting operation ends. Since in a panning or tilting state, no correction for unintentional hand movement is conducted, no adverse influence is exerted on operability in panning or tilting operation.

Figure 13A:
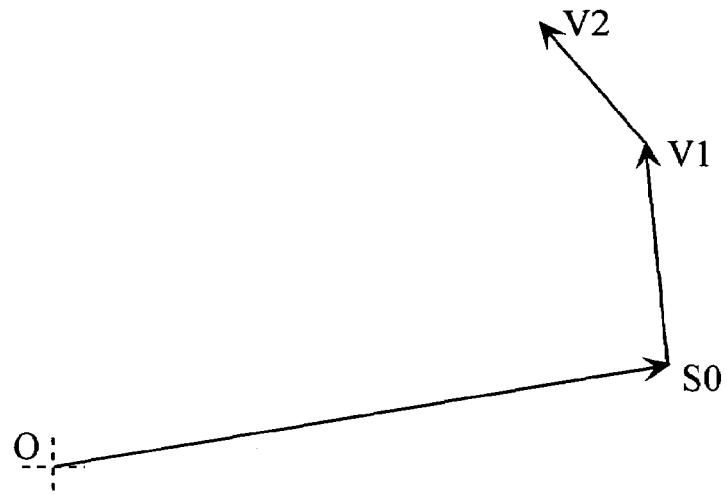
FIGS. 13a, 13b and 13c are model diagrams showing changes in integral vectors till two frames elapses after transition from panning or tilting state to an unintentional hand movement state.
Figure 13B:
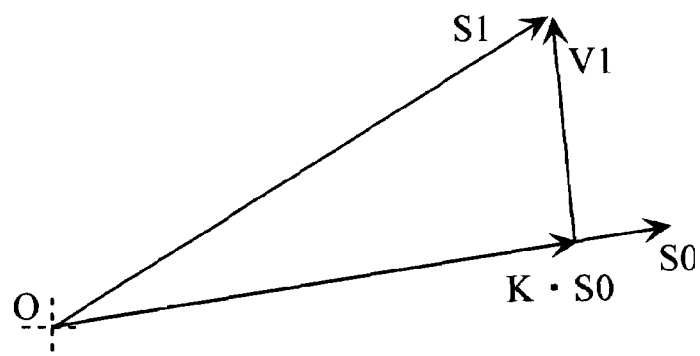
Figure 13C:
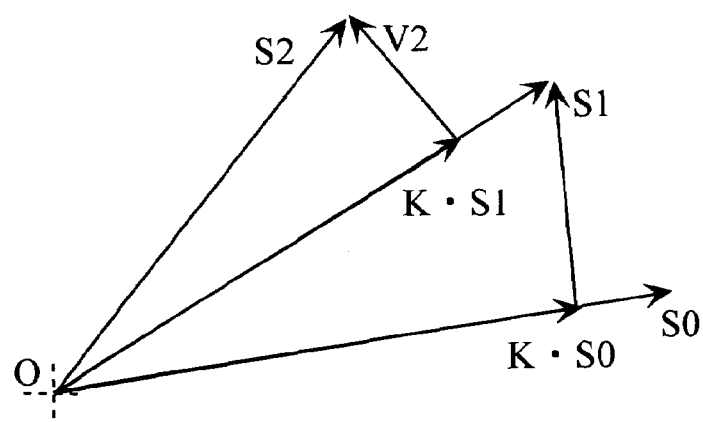

Detailed description will be given of this point. FIGS. 13a to 13c show changes in integral vectors S0 to S2 in a conventional method calculating an integral vector $S_n$ based on the equation (1) till two frames elapses after a transition from a panning or tilting state to an unintentional hand movement state.

As shown in FIG. 13a, if an integral vector when a panning or tilting state transitions to an unintentional hand movement is indicated with S0, a motion vector of the next frame V1 and a motion vector of the frame after the next one frame V2 by definition, an integral vector S1 of the next frame, as shown in FIG. 13b, is given by S1=K·S0+V1. An integral vector S2 of the frame after the next two frames is given, as shown FIG. 13c, by S2=K·S1+V2.

FIGS. 14a to 14d show changes in integral vectors S0 to S3 in a method according to the invention till three frames elapse after transition from a panning or tilting state to an unintentional hand movement.

Figure 14A:
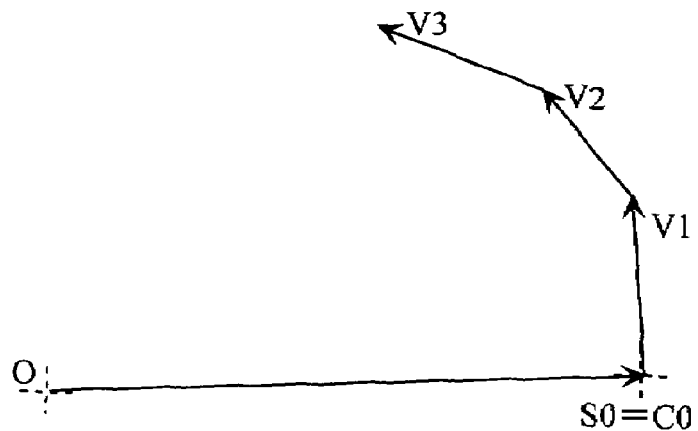
FIGS. 14a, 14b, 14c and 14d are model diagrams showing changes in integral vectors S0 to S3 till three frames elapses after transition from panning or tilting state to an unintentional hand movement state.
Figure 14B:
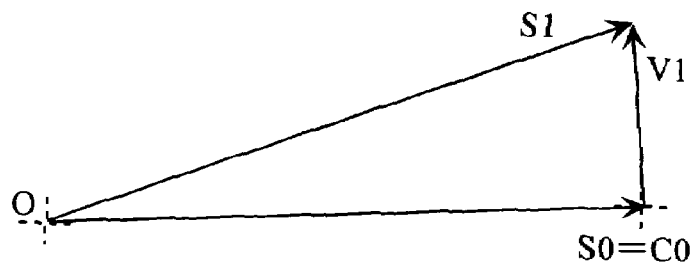

If, as shown in FIG. 14a, an integral vector when a panning or tilting state changes to an unintentional hand movement is indicated with S0, a damping center C C0, a motion vector of the next frame V1, a motion vector of the frame after the next frame V2, a motion vector of the frame after the next two frames V3 by definition, an integral vector of the frame after the next frame S1 is, as shown in FIG. 14b, given by S1=K·(S0−S0)+V1+S0=V1+S0 since C0=S0.

Figure 14C:
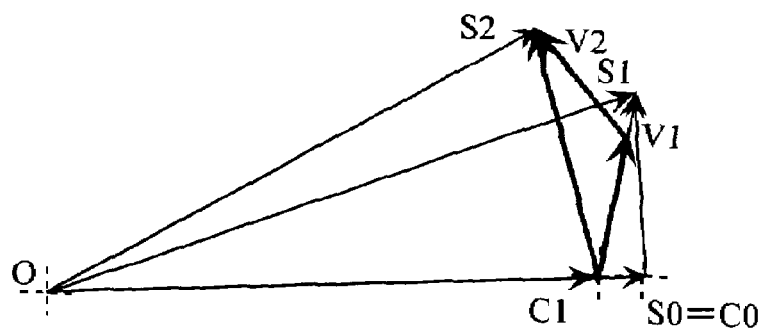
Figure 14D:
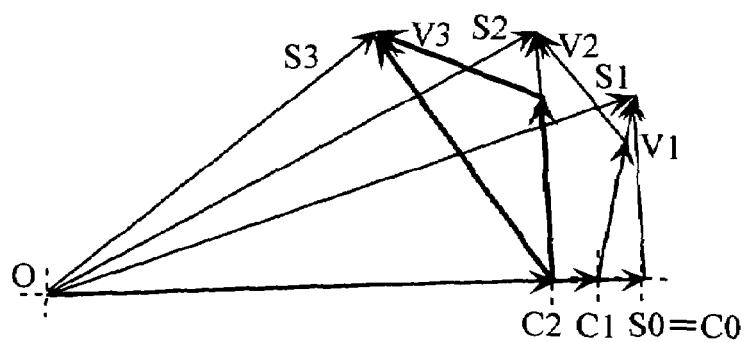

Then, the integral vector S2 of the frame after the next two frames is, as shown in FIG. 14c, given by S2=K·(S1-C1)+V2+C1. C1, here, is a new damping center obtained with C1=$K_c$·C0. Similarly, the integral vector S3 of the frame after the next three frames is given, as shown in FIG. 14d, by S3=K·(S2−C2)+V3+C2. C2, here, is a new damping center obtained with C2=Kc·C1.

In a conventional method, as shown in FIGS. 13a to 13c, an integral vector $S_n$ is attenuated with a damping coefficient K at the point O as a center. On the other hand, in a method of the invention, as shown in FIGS. 14a to 14d, an integral vector ($S_n$−$C_n$) from a point $C_n$ is attenuated with a damping coefficient K at the point $C_n$ as a center. This means that in a conventional method, correction for an unintentional hand movement is applied with a damping coefficient K with a start frame as a reference, while in a method of the invention, correction for an unintentional hand movement is applied with a damping coefficient K with a frame when a panning or tilting state ends as a reference.

Therefore, in a conventional method, with decrease in damping coefficient K of an integral vector, $S_n$ is directly attenuated and a change quantity $\Delta S_n$ is larger, making a change in figure more conspicuous, while in a method of the invention, even with decrease in damping coefficient K of an integral vector, only a damping velocity of $S_n$−$C_n$, that is only a velocity at which $S_n$ approaches $C_n$ increases, and a change velocity $\Delta S_n$ of $S_n$ depends basically on a change quantity of $C_n$, that is a change velocity $\Delta S_n$ of $S_n$ depends strongly on a damping coefficient $K_c$ of a damping center, but depends on almost no damping coefficient K of an integral vector. Hence, in a method of the invention, a change velocity of $S_n$, that is a centering velocity of a trimming frame (a trimming position of an image) can be adjusted to a desired value independently of a frequency characteristic of a swing in unintentional hand movement.

Figure 15:
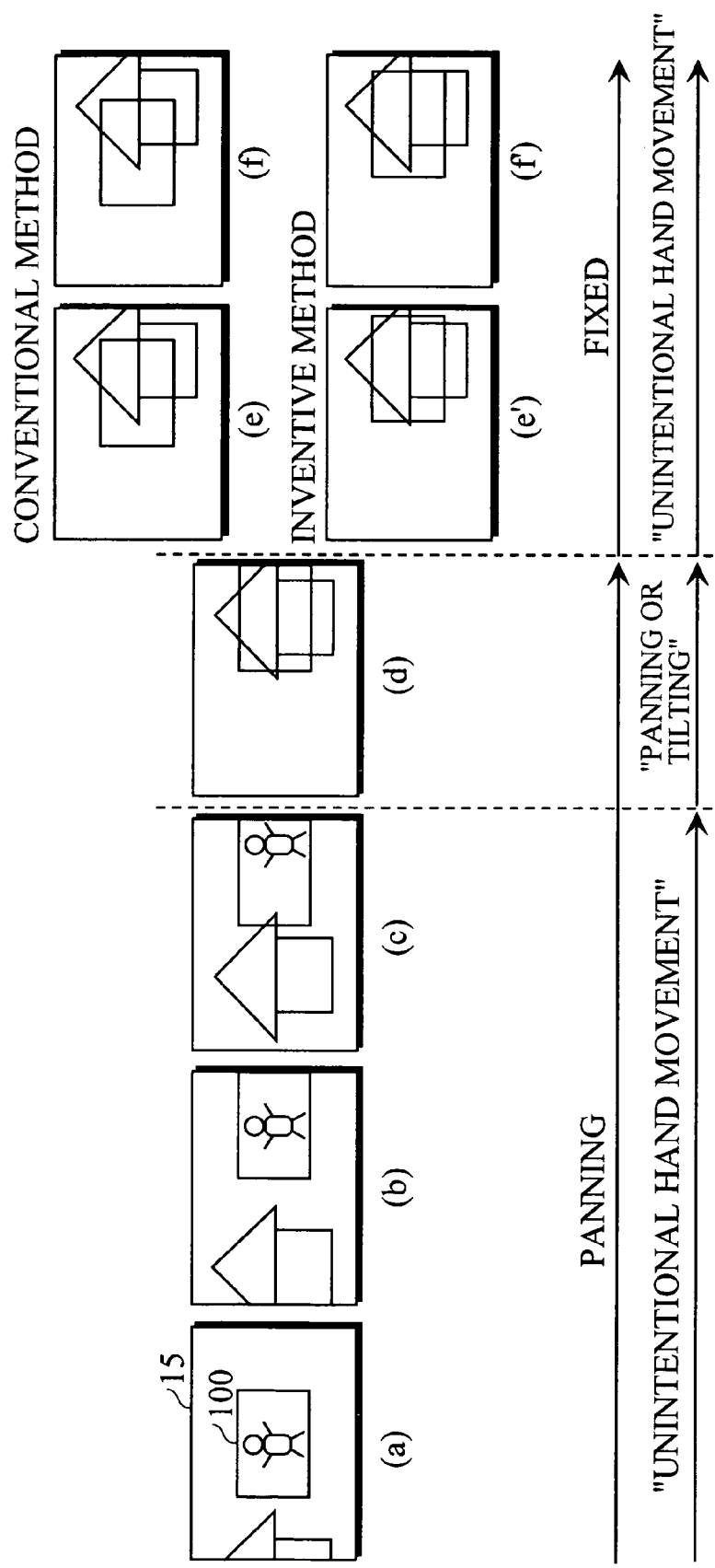
FIG. 15 is a model diagram showing changes in a trimming frame and a figure in a case where a video camera is fixed after panning of a video camera in the left direction.

FIG. 15 shows changes in a trimming frame and a figure in a case where a video camera is fixed after panning of a video camera in the left direction.

In a conventional method, since a current state at an initial period of a panning operation is determined to be an unintentional hand movement state, a trimming frame 100 moves according to a movement of a camera as shown in (a) and (b) of FIG. 15. Since, correction for an unintentional hand movement, on this occasion, is conducted based on $S_n$=K·$S_{n-1}$+$V_n$, no change occurs in a figure.

When a trimming frame 100, as shown in (b) of FIG. 15, reaches a frame memory end, the trimming frame 100 is, as shown in (c) of FIG. 15, fixed at the frame memory end even in a later frame. If the trimming frame 100 is fixed at the frame memory end, no correction for unintentional hand movement is substantially conducted; therefore, the figure changes only by a movement quantity of the camera. If this state continuously occurs ten times, it is determined that a transition has occurred from an unintentional hand movement state to a panning or tilting state and the trimming frame 100 takes a fixed state ($S_n$=$S_{n-1}$). In this case, the figure changes, as shown in (d) of FIG. 15, only by a movement quantity of the camera.

Thereafter, if the camera is fixed, no change occurs in the figure and it is determined that a panning or tilting state has transitioned to an unintentional hand movement state. Since $V_n$=0, the trimming frame 100 is, as shown in (c) to (f) of FIG. 15, moved by $S_n$=K·$S_{n-1}$. If a damping coefficient K of an integral vector is 0.9 and $S_n$ at transition from a panning or tilting state to an unintentional hand movement is 64 pixels, a movement velocity $\Delta S_n$ is 6.4 pixels/frame.

Figure 16:
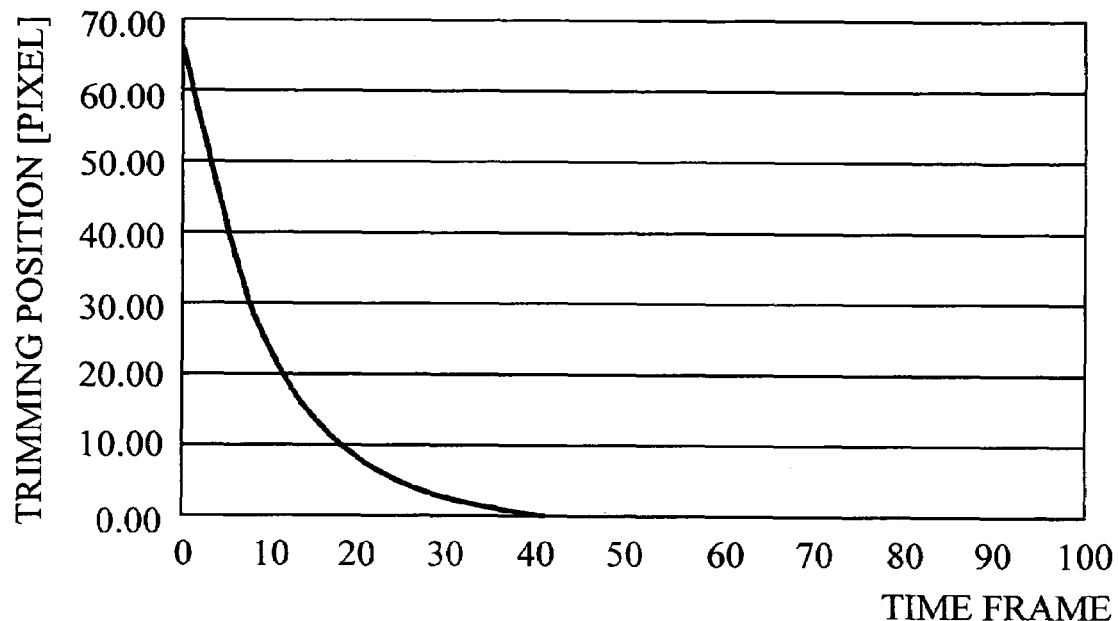
FIG. 16 is a graph, in a case where a conventional method is adopted, showing a relationship between an elapsed time (the number of frames) from a transition point in time from the panning or tilting state to an unintentional hand movement of FIG. 15 and a position of a trimming frame (a figure).

In FIG. 16, there is shown a relationship between an elapsed time (the number of frames) from transition from the panning or tilting state to the unintentional movement state and a position of a trimming frame (figure). For example, after a panning or tilting state transitions to an unintentional hand movement state, a change quantity of the figure in 1 second (30 frames) is 58 pixels and the figure largely changes even though the camera stays unmoved, which leads to an unnatural image.

On the other hand, in a method of the invention, since it is determined in an initial period of a panning operation that a current state is an unintentional hand movement state, the trimming frame 100, as shown in (a) and (b) of FIG. 15, moves according to movement of the camera. On this occasion, since an initial value of a damping center C is 0, correction for an unintentional hand movement is applied based on $S_n$=K·$S_{n-1}$+$V_n$, as conventional; therefore, almost no change occurs in the figure.

When the trimming frame 100, as shown in (b) of FIG. 15, reaches the frame memory end, the trimming frame 100 is, as shown in (c) of FIG. 15, fixed at the frame memory end in a later frame as well. If the trimming frame 100 is fixed at the frame memory end, substantially no correction for unintentional hand movement is conducted; therefore the figure changed by a movement distance of the camera. When the state continuously occurs 10 times, it is determined that an unintentional hand movement state has transitioned to a panning or tilting state and the trimming frame 100 takes a fixed state ($S_n$=$S_{n-1}$). In this case, the figure changes only by a movement quantity of the camera.

Thereafter, if the camera is fixed, no change occur in the figure and it is determined that a panning or tilting state has transitioned to an unintentional hand movement state. Since $V_n$=0, the trimming frame 100 moves, as shown in (e') to (f') of FIG. 15, based on $S_n$=K·($S_{n-1}$−C)+C (wherein C is updated with C=$K_c$·C). If a damping coefficient K of an integral vector is set to 0.9, a damping coefficient $K_c$ of a damping center is set to 0.98 and $S_n$ (=C) in transition from a panning or tilting state to an unintentional hand movement state is set to 64 pixels, a movement velocity is $\Delta S_n$=$\Delta C$=1.28 pixels/frame.

Figure 17:
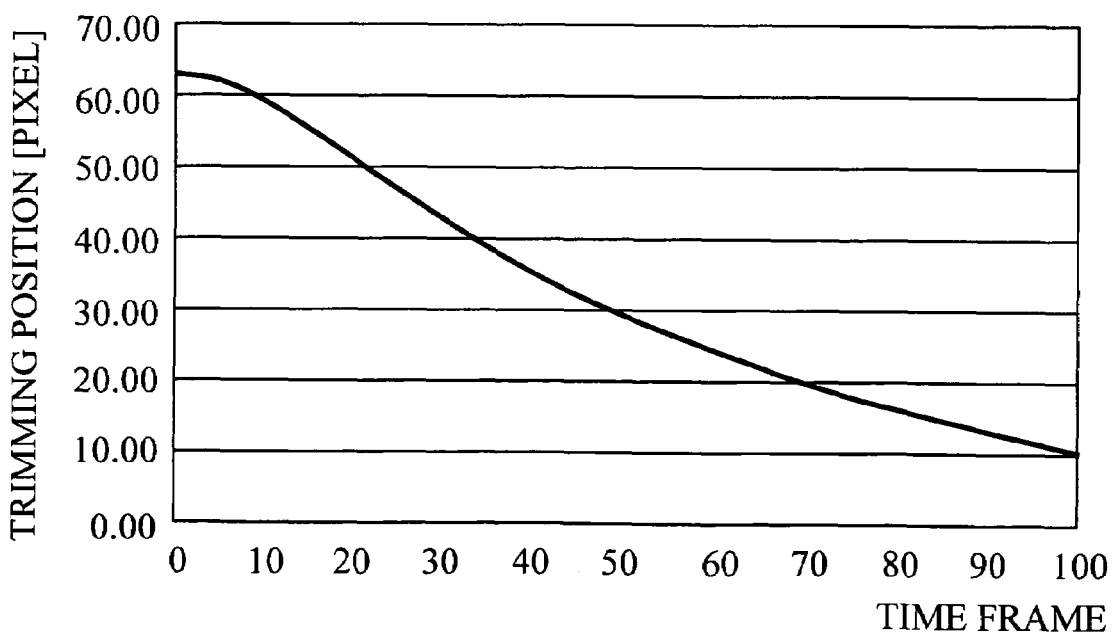
FIG. 17 is a graph, in a case where a method according to the invention is adopted, showing a relationship between an elapsed time (the number of frames) from a transition point in time from the panning or tilting state to an unintentional hand movement of FIG. 15 and a position of a trimming frame (a figure).

In FIG. 17, there is shown a relationship between an elapsed time (the number of frames) from transition from a panning or tilting state to the unintentional hand movement and a trimming frame (figure). For example, a change quantity of a figure in 1 second (30 frames) after transition from a panning or tilting state to an unintentional hand movement is 20 pixels and since after the camera is fixed, the figure changes gradually, an image with no strange feeling is produced as compared with a conventional method.

FIGS. 18a, 18b, 18c and 18d show a relationship between the number of frames and displayed images (figures) on a video camera 10 in a case where an actual state of a video camera 10 changes from an unintentional hand movement, to a panning state and to a fixed state.

Figure 18A:
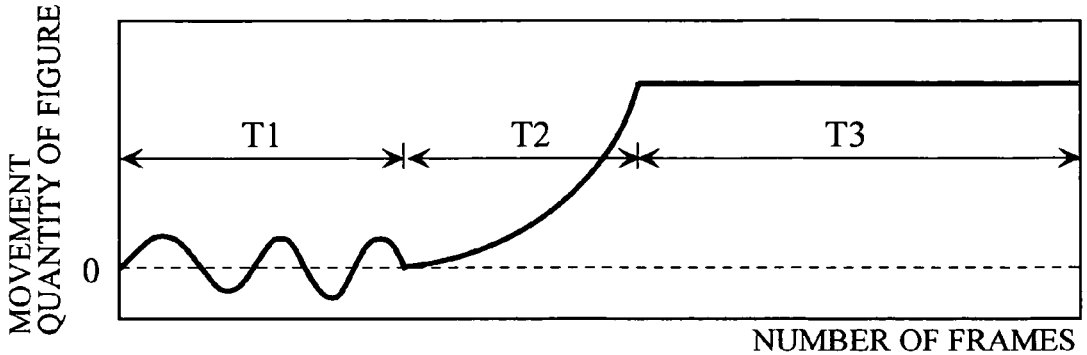
FIGS. 18a, 18b, 18c and 18d are graphs showing a relationship between the number of frames and movement quantities of displayed images (figures) on a video camera 10 in a case where an actual state of a video camera 10 changes from an unintentional hand movement, to a panning state and to a fixed state.
Figure 18B:
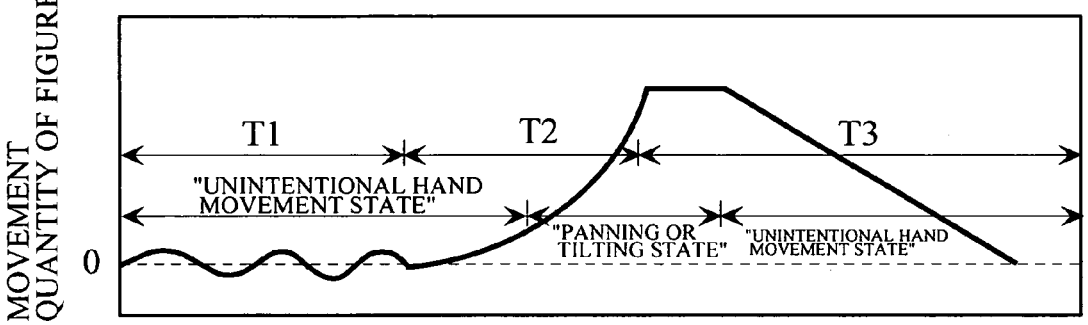
Figure 18C:
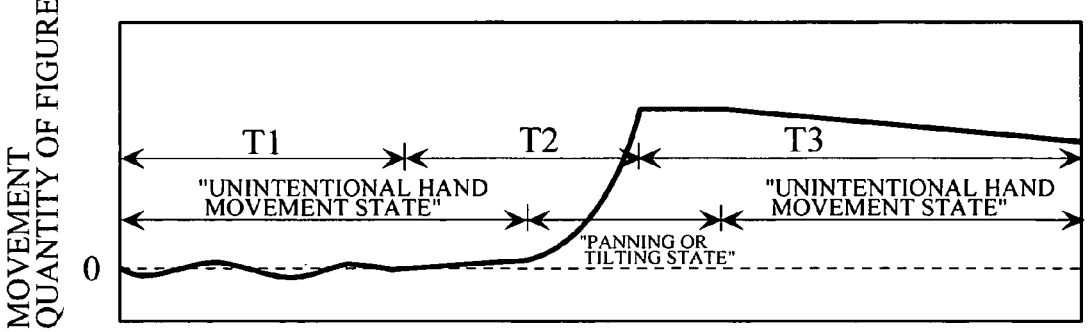
Figure 18D:
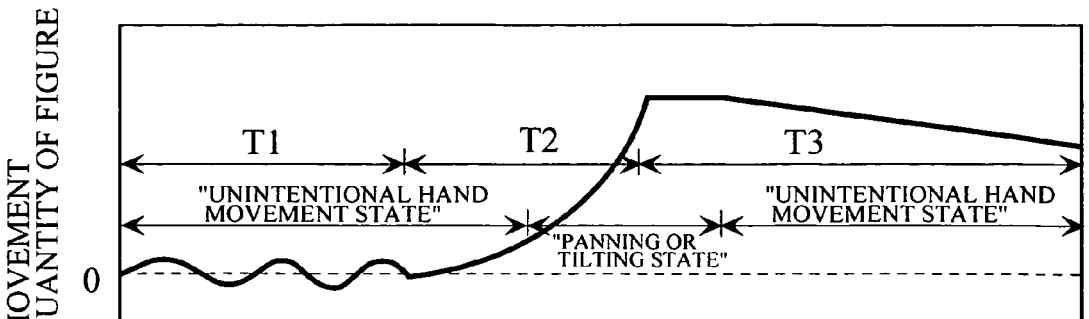
Figure 19:
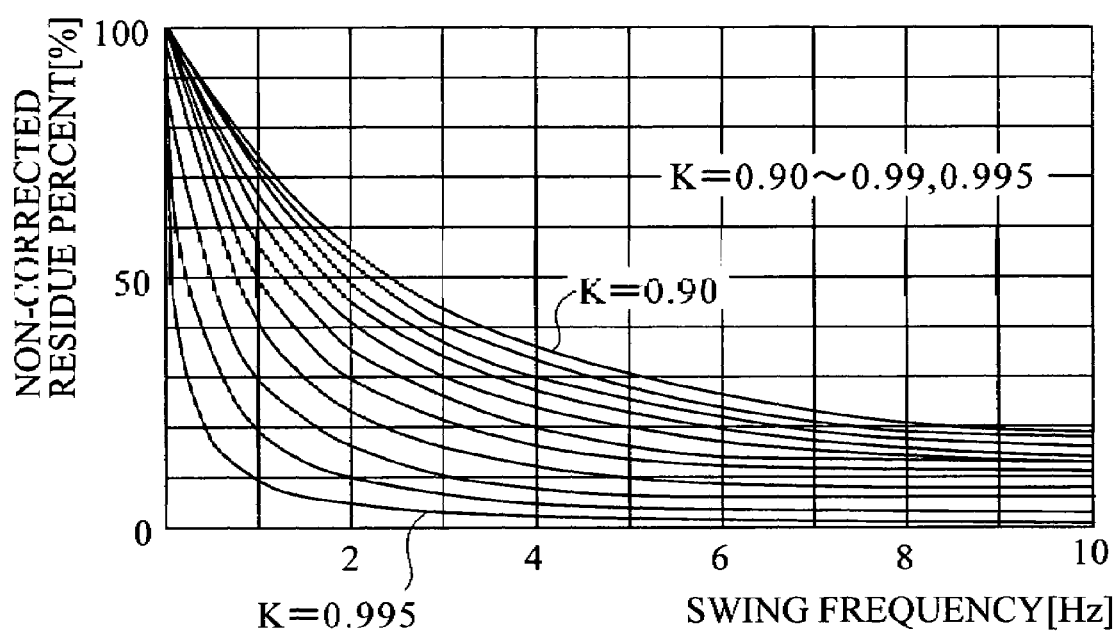
FIG. 19 is a graph showing a relationship between a swing frequency and a non-corrected residue percent with a damping coefficient K as a parameter.

FIG. 18(a) shows a movement quantity of the figure in a case where no correction for an unintentional hand movement is applied, FIG. 18b shows a movement quantity of the figure in a case where correction for an unintentional hand movement is applied with a damping coefficient as 0.9 in a conventional technique calculating an integral vector $S_n$ based on the equation (1) (referred to as a first conventional technique), FIG. 18c shows a movement quantity of the figure in a case where correction for an unintentional hand movement is applied with a damping coefficient as 0.98 in a conventional technique calculating an integral vector $S_n$ based on the equation (1) (referred to as a second conventional technique), and FIG. 18d shows a movement quantity of the figure in a case where correction for an unintentional hand movement is applied in the example (wherein for convenience, a damping coefficient K of an integral vector is set to 0.9 and a damping coefficient $K_c$ of a damping center is set to 0.98).

In a case where an actual state is an unintentional hand movement as shown in the period T1, it is determined even by the camera 10 that the actual state is an intentional hand movement state and correction for an intentional hand movement is applied in a conventional technique (FIGS. 18b and 18c) or in the example as well.

If the actual state changes, as shown in a period T2, from an unintentional hand movement state to a panning state, since it is determined that at an initial stage after the change, a current state is an unintentional hand movement state, correction for an unintentional hand movement is applied in the initial state, thereafter, one of the first transition condition, the second transition condition and the third transition condition from an unintentional hand movement to a panning or tilting state is satisfied and a result of determination by the video camera 10 transitions from the unintentional hand movement state to the panning or tilting state. As a result. no correction for unintentional hand movement is applied and movement of the figure after correction is equal to that in a case no correction for an unintentional hand movement is applied.

In a period till a result of determination of the camera 10 is transitioned from an unintentional hand movement to a panning or tilting state after the change from the unintentional hand movement to the panning state as an actual state, since a damping coefficient K is large and even a swing of a low frequency component is strongly corrected in a second conventional technique (FIG. 18c), a phenomenon conspicuously occurs that an image does not move in an intended direction (a stick phenomenon). On the other hand, in the first conventional technique (FIG. 18b) and the example (FIG. 18d), since a damping coefficient K is small and a correction level for a swing of a low frequency component is weak, a stick phenomenon is alleviated.

When an actual state changes, as shown in a period T3, from a panning state to a fixed state, one of the first transition condition or the second transition from a panning or tilting state to an unintentional hand movement state is satisfied, a result of determination by the video camera 10 transitions from a panning or tilting state to an unintentional hand movement state.

When a panning or tilting state transitions to an unintentional hand movement state, a trimming position, in a conventional technique, is subjected to centering with a damping coefficient K of an integral vector, while a trimming position of an image, in the example, is subjected to centering mainly with a damping coefficient $K_c$ of a damping center C. Since in the first conventional technique (FIG. 18b), a damping coefficient K of an integral vector is small, and a centering velocity of a trimming position of an image is fast, to thereby change a figure rapidly. On the other hand, since in the second conventional technique (FIG. 18c), a damping coefficient K of an integral vector is large and in the example (FIG. 18d), damping coefficient $K_c$ of a damping center C is large, a centering velocity of a trimming position of an image is slow to thereby change the figure gradually.

That is, in a conventional technique, since one damping coefficient K determines a frequency characteristic of a swing and a centering velocity, neither a stick feeling at the start of a panning operation nor a conspicuous centering after the panning operation can be reduced, while in a video camera 10 of the example, since a frequency characteristic of a swing to be corrected and a centering velocity can be adjusted with respective independent damping coefficients, a stick feeling at the start of a panning operation and conspicuous centering can both be reduced.

Note that a motion vector may be obtained, for example, using an angular velocity sensor instead of obtaining a motion velocity using a representative point matching method. Correction for an unintentional hand movement may be applied, for example, by controlling a lens angle, a lens position or a position of a light receiving element in stead of controlling a trimming position of an image memory.

In the example, a damping coefficient K of an integral vector changes according to a zoom magnification (a focal point distance F), while a damping coefficient K of an integral vector may be fixed.

In the example, in step S9 of FIG. 10, an integral vector $S_n$ is calculated based on the equation (3) and thereafter, in step S10 of FIG. 10, a damping center C is updated based on the equation 4, while instead, the damping center C is allowed not to be updated. That is, step S10 of FIG. 10 may be omitted. In this case, while an initial value of the damping center C is 0, when transition is, as shown in step S34 of FIG. 12, conducted from a pinning or tilting state to an unintentional hand movement state, setting is made so as to be $C=S_n$. In a case where step S10 of FIG. 10 is omitted, a trimming position of an image converges toward the damping center C.

What is claimed is:

1. An unintentional hand movement canceling device, comprising:
   a swing detecting unit (18), (20) arranged to detect a swing of an image; and
   a correction quantity generating unit (20) arranged to generate a correction quantity $S_n$ to calculate a correction position based on a swing quantity $V_n$ detected by the swing detection unit (18), (20), a damping coefficient K of a swing quantity for controlling a characteristic of a non-corrected residue percent at a swing frequency and a damping center C of the swing quantity, the correction quantity having a variable characteristic of a non-corrected residue percent at a frequency of the swing and a variable damping center of a swing quantity, wherein
   the correction quantity $S_n$ is represented by a function $f(S_{n-1}, V_n, K, C)$, where the function has $S_{n-1}$, $V_n$, K and C as its elements, and $S_{n-1}$ is a correction quantity in a preceding frame, $V_n$ is the swing quantity, K is the damping coefficient of the swing quantity and C is the damping center of the swing quantity, wherein the function $f(S_{n-1}, V_n, K, C)$ is represented by the following equation:

$$S_n = K \cdot (S_{n-1} - C) + V_n + C.$$

2. The unintentional hand movement canceling device according to claim 1, wherein the damping center C of the swing quantity is updated based on $C = K_c \cdot C$ each time the correction quantity $S_n$ is updated, where $K_c$ is a damping coefficient of the damping center.

3. An imaging apparatus, comprising:

a swing detecting unit (18), (20) arranged to detect a swing of an image; and a correction quantity generating unit (20) arranged to generate a correction quantity $S_n$ to calculate a correction position based on a swing quantity $V_n$ detected by the swing detection unit (18), (20), a damping coefficient K of a swing quantity for controlling a characteristic of a non-corrected residue percent at a swing frequency and a damping center C of the swing quantity, the correction quantity having a variable characteristic of a non-corrected residue percent at a frequency of the swing and a variable damping center of a swing quantity, wherein the correction quantity $S_n$ is represented by a function $f(S_{n-1}, V_n, K, C)$, where the function has $S_{n-1}, V_n$, K and C as its elements, and $S_{n-1}$ is a correction quantity in a preceding frame, $V_n$ is the swing quantity, K is the damping coefficient of the swing quantity and C is the damping center of the swing quantity, wherein the function $f(S_{n-1}, V_n, K, C)$ is represented by the following equation:

$$S_n = K \cdot (S_{n-1} - C) + V_n + C.$$

4. The imaging apparatus according to claims 3, wherein the damping center C of the swing quantity is updated based on $C = K_c \cdot C$ each time the correction quantity $S_n$ is updated, where $K_c$ is a damping coefficient of the damping center.

* * * * *